United States Patent [19]

Matsumoto

[11] Patent Number: 4,651,612
[45] Date of Patent: Mar. 24, 1987

[54] ELECTRONIC MUSICAL INSTRUMENT WITH PLAY GUIDE FUNCTION

[75] Inventor: Naoaki Matsumoto, Tokyo, Japan

[73] Assignee: Casio Computer Co., Ltd., Tachikawa, Japan

[21] Appl. No.: 614,848

[22] Filed: May 29, 1984

[30] Foreign Application Priority Data

Jun. 3, 1983 [JP]  Japan .................................. 58-98034

[51] Int. Cl.⁴ .............................................. G10F 1/00
[52] U.S. Cl. ....................................... 84/1.03; 84/478; 84/470 R
[58] Field of Search .................. 84/1.03, 1.28, 470 R, 84/477 R, 478

[56] References Cited

U.S. PATENT DOCUMENTS 4,344,344  8/1982  Nakada et al. .
4,378,720  4/1983  Nakada et al. ........................ 84/1.03
4,402,244  9/1983  Nakada et al. ........................ 84/1.03
4,432,266  2/1984  Nakada ................................. 84/1.03
4,484,507 11/1984  Nakada et al. ..................... 84/478 X Primary Examiner—William M. Shoop, Jr.
Assistant Examiner—Sharon D. Logan
Attorney, Agent, or Firm—Frishauf, Holtz, Goodman & Woodward

[57] ABSTRACT

When autoplay data stored in a memory is readout at a predetermined regular rate, the timing of a key operation executed under the guidance of a melody guide function is compared to its corresponding regular timing, and the rate of the data readout from the memory is corrected according to the result of the comparison, the corrected readout rate being subsequently changed back to the initial rate. This control is effected by a CPU.

6 Claims, 32 Drawing Figures

F I G. 2
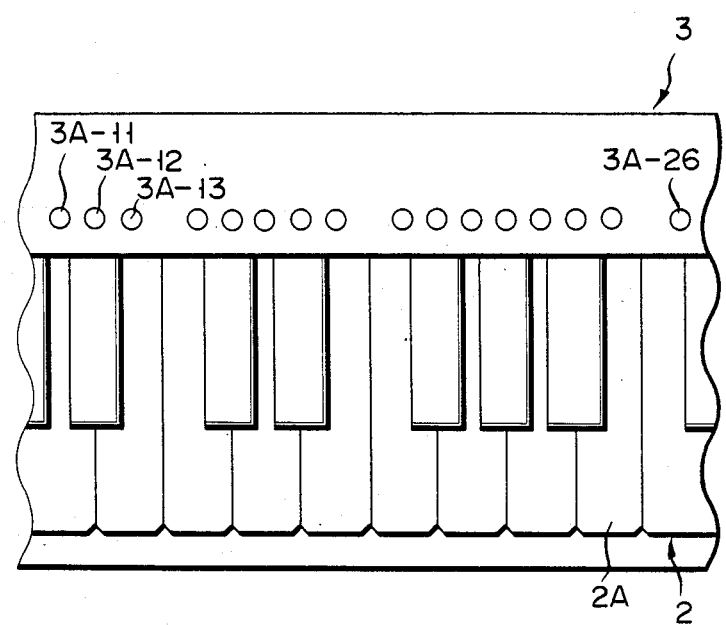

FIG. 13
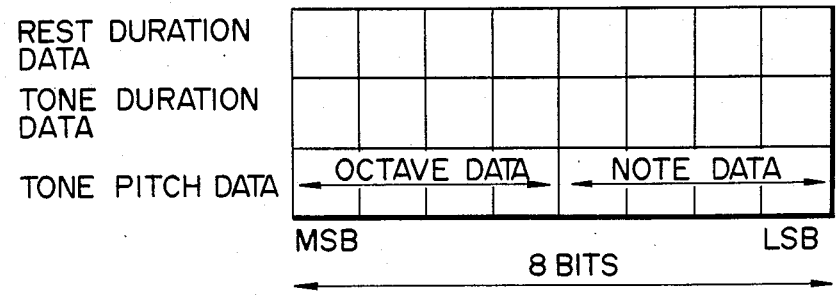
FIG. 15
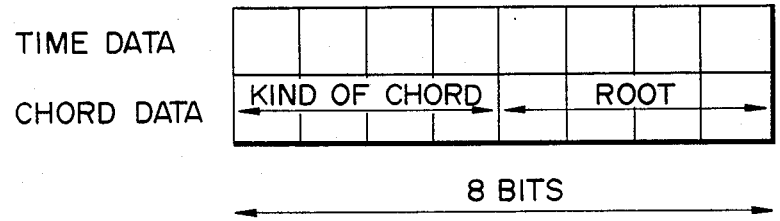
FIG. 16
| KIND OF CHORD | | ROOT | |
|---|---|---|---|
| F | NOP | F | END MARK |
| E | NOP | E | NOP |
| D | NOP | D | NOP |
| C | NOP | C | B |
| B | NOP | B | A# |
| A | NOP | A | A |
| 9 | NOP | 9 | G# |
| 8 | DIMINISHED | 8 | G |
| 7 | AUGMENT | 7 | F# |
| 6 | 6 TH | 6 | F |
| 5 | SUS 4 | 5 | E |
| 4 | MINOR 7TH | 4 | D# |
| 3 | 7 TH | 3 | D |
| 2 | MINOR | 2 | C# |
| 1 | MAJOR | 1 | C |
| 0 | NOP | 0 | NOP |

FIG. 14

| NOTE DATA | | OCTAVE DATA | NOTE DATA | DURATION DATA, REST DATA | |
|---|---|---|---|---|---|
| F | END MARK | F | NOP | C0 | 0×2, ▬×2 |
| E | NOP | E | NOP | --- | |
| D | NOP | D | NOP | 60 | 𝅝 , 𝄻 |
| C | B | C | NOP | --- | |
| B | A# | B | NOP | 30 | 𝅗𝅥 , 𝄼 |
| A | A | A | NOP | --- | |
| 9 | G# | 9 | 14080 | 18 | 𝅘𝅥 , 𝄽 |
| 8 | G | 8 | 7040 | --- | |
| 7 | F# | 7 | 3520 | 0C | 𝅘𝅥𝅮 , 𝄾 |
| 6 | F | 6 | 1760 | --- | |
| 5 | E | 5 | 880 | 01 | 1/24, 𝄾/24 |
| 4 | D# | 4 | 440 | | |
| 3 | D | 3 | 220 | | |
| 2 | C# | 2 | 110 | | |
| 1 | C | 1 | 55 | | |
| 0 | REST | 0 | REST | | |

FIG. 19

F I G. 20A
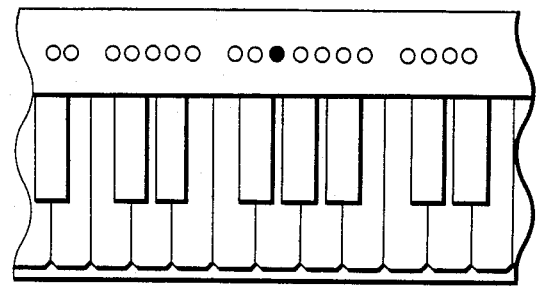
• TURN-ON
F I G. 20B
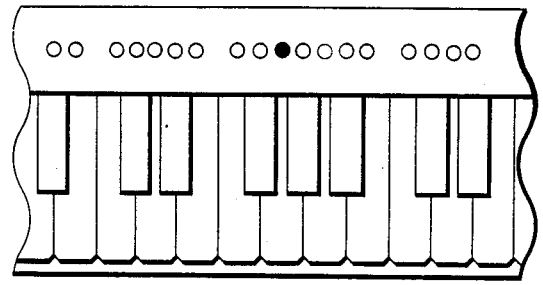
F I G. 20C
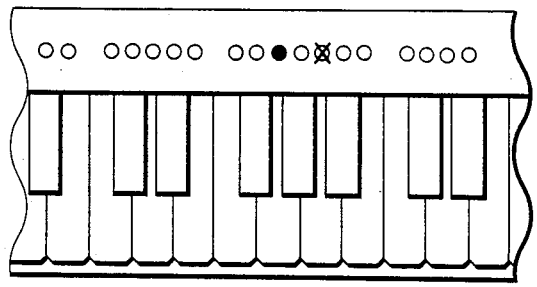
• TURN-ON
✕ FLICKERING

ELECTRONIC MUSICAL INSTRUMENT WITH PLAY GUIDE FUNCTION

BACKGROUND OF THE INVENTION

This invention relates to an electronic musical instrument having a play guide function.

Heretofore, there have been a variety of electronic musical instruments in which data for the automatic playing of musical pieces is stored in a memory so that the data is successively readout from the memory in accordance with the progress of each piece as it is automatically played. Among these electronic musical instruments, there are those which have a play guide function as a beginner's exercise. For example, there is an electronic musical instrument which is capable of being automatically played, the reading timing of the data from memory is made to conform with the beginner's manually playing of the instrument. However, because the beginner's keying is often irregular and improper, the accompanying autoplay tempo becomes irregular and improper. In such a case, the beginner player can no longer follow the regular tempo. Therefore, an effective exercise of the manual play function cannot be obtained, and the autoplay itself is very difficult to discern.

SUMMARY OF THE INVENTION

An object of the invention is to provide an electronic musical instrument which permits the beginner to make effective use of the manual play function and which also is capable of providing a readily discernible autoplay even when the play guide function is in force.

According to the invention, there is provided an electronic musical instrument, which comprises: a memory for storing a plurality of different autoplay data to be simultaneously and automatically played, including melody data and accompaniment data for at least one musical piece; means for successively reading out each of the stored autoplay data at a predetermined rate; means for performing autoplay according to the readout autoplay data; guide means for instructing the player about the next play operation to be executed, according to at least one of the plurality of different readout autoplay data; means for comparing the timing of the play operation after receiving the instruction of the guide means with the regular timing determined by the autoplay data readout from the memory means; means for correcting the rate that the plurality of different autoplay data according to the output of the comparing means is readout; and control means for causing the corrected data readout rate for the plurality of different autoplay data to be recorrected to its original state and for causing the data to be continually read.

BRIEF DESCRIPTION OF THE DRAWINGS

FIG. 2 is a fragmentary view showing a keyboard and a LED array;

FIG. 13 shows the data configuration of a note from melody 1 and melody 2;

FIG. 14 shows note data, octave data, note duration data, rest data, etc. of melody 1 and melody 2;

FIG. 15 shows a data configuration of a chord;

FIG. 16 shows chord kind data and root data;

FIG. 19 shows an example in which the autoplay musical piece of FIGS. 17A to 17C is manually played in a following mode; and FIGS. 20A to 20F show different states of the "on" and "flicker" of the LED array.

DETAILED DESCRIPTION OF THE PREFERRED EMBODIMENT

Figure 1:
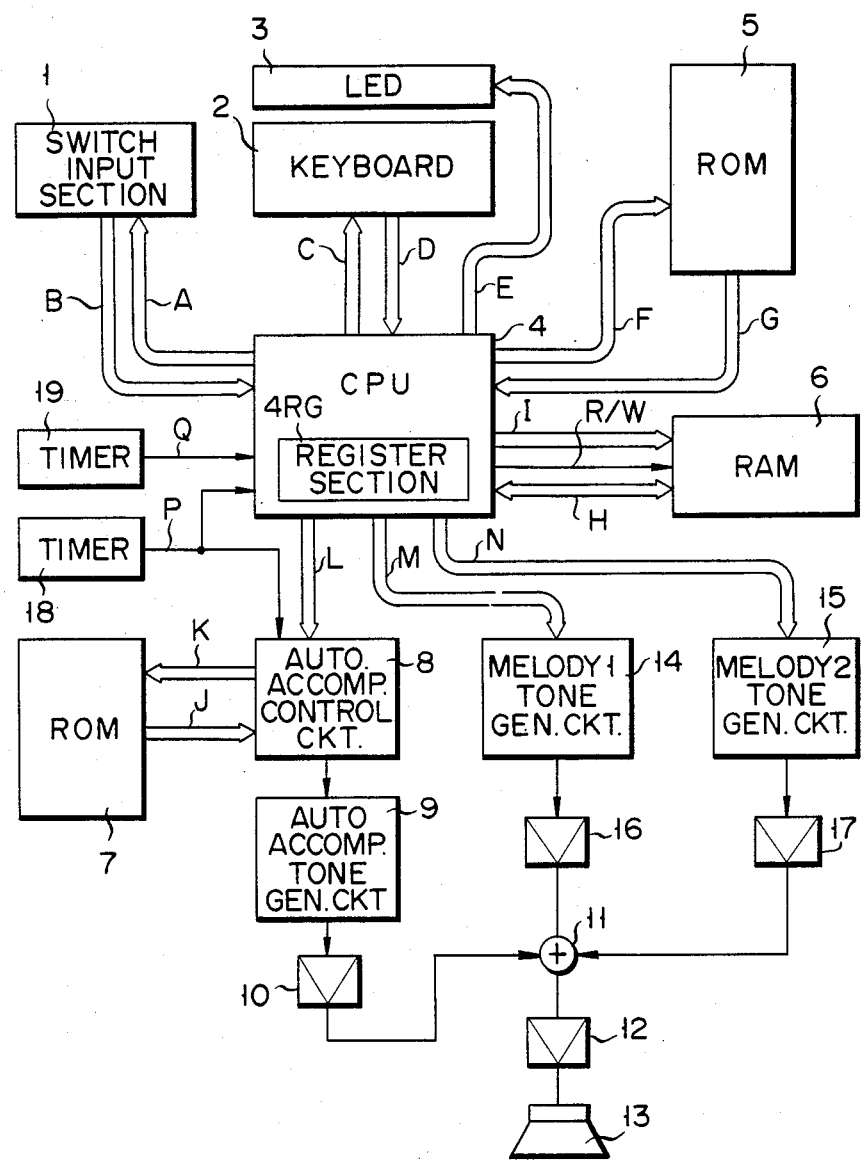
FIG. 1 is a block diagram showing an embodiment of the electronic musical instrument according to the invention.

The invention will now be described in conjunction with an embodiment thereof with reference to the accompanying drawings. Referring to FIG. 1, there is shown the circuitry of an embodiment of the electronic musical instrument according to the invention. A switch input section 1 includes switches which are operable for selecting one of 20 autoplay musical pieces stored in a memory, switches which are operable for selecting one of a plurality of different rhythms which are also stored in a memory, switches which are operable for selecting one of a plurality of different available timbres, and an autoplay start/stop switch. The switch input section 1 further includes a guide mode switch for on-off switching a melody guide function permitting the note and duration of a tone being sounded, and permitting the next tone to be sounded in the melody 1 of a selected autoplay musical piece which is displayed by a guide LED (light-emitting diode) array 3 consisting of LEDs provided for each key of the keyboard 2. The switch input section 1 further includes two switches (i.e., first and second guide LED switches) to be described later, which are used in combination with the guide mode switch, and a following mode switch for on-off switching a following mode to be described later. The individual switches in the switch input section 1 are scanned by a scan signal A provided from a CPU (central processor unit) 4. An output signal B from the section 1 is fed to the CPU 4 to be processed therein. The guide mode switch and first guide LED switch are on-off operable together for on-off switching the melody guide function. When second guide LED switch is "on", it causes the guide LED function (to be described later), which has been turned off by turning off the first guide LED switch, to be automatically turned on. This operation is controlled by the CPU 4 when no key operation has been done for a predetermined period of time.

The keyboard 2 has 36 key switches (which cover three octaves). These key switches are scanned by a scan signal C provided from the CPU 4, and their output signal D is fed to the CPU 4 to be processed therein. The guide LED array 3 is controlled for on-off and flicker display according to a display control signal E (to be described later) which is provided from the CPU 4.

The CPU 4 controls all the operations of the electronic musical instrument, and it includes a microprocessor and a register section 4RG having various registers to be descrbied later.

An autoplay data ROM (read-only memory) 5 is provided for storing data for 20 autoplay musical pieces. When an autoplay musical piece is selected for autoplay, the CPU 4 provides address data F to the ROM 5 for reading out the melody data G for the piece to write the readout data as data H into an autoplay RAM (random access memory) 6. The RAM 6 is address designated by address data I provided from the CPU 4, and the reading and writing of data into the RAM 6 is controlled by a read/write control signal R/W.

An autoplay accompaniment pattern data ROM 7 stores data for a plurality of different autoplay accompaniment patterns. When one of the autoplay accompaniment patterns is selected by the operation of a switch in the switch input section 1, the corresponding data J is readout from the ROM 7 and fed to an autoplay accompaniment control circuit 8. The autoplay accompaniment control circuit 8 provides address data K to the ROM 7 under the control of control data L provided from the CPU 4. Also, it provides a control signal to an autoplay accompaniment tone generator circuit 9. The autoplay accompaniment tone generator circuit 9 generates an autoplay accompaniment tone signal according to the selected autoplay accompaniment pattern, the autoplay accompaniment tone signal thus generated being fed through a D/A converter (not shown), an amplifier 10, an adder 11, an amplifier 12, and a loudspeaker 13 where the tone signal is made audible.

The autoplay accompaniment control circuit 8 also receives chord data read out from the ROM 5 during autoplay and feeds this data through the autoplay accompaniment tone generator circuit 8 to make sound. During this time, melody 1 data and melody 2 data, which are simultaneously readout from the ROM 5, are fed as respective data M and N from the CPU 4 to the melody 1 tone generator circuit 14 and the melody 2 tone generator circuit 15 for generating melody signals. These melody signals are fed to the respective amplifiers 16 and 17, the outputs of which are in turn fed through D/A converters (not shown) to the adder 11. As for the tones due to the operation of the keys on the keyboard 2, the melody 1 tone generator circuit 14 generates their melody signals.

A timer 18 is a circuit for setting tempo. For example, every time it counts a time interval equal to 1/24 of the interval corresponding to a quarter note, it generates an overflow signal P which is fed to the CPU 4 and the autoplay accompaniment control circuit 8. The counting speed of the timer 18 can be varied by operating a tempo control knob provided in the switch input section 1.

Another timer 19 is a circuit for providing a flicker time of each of the LEDs in the guide LED array 3. Every time it counts a predetermined time interval, it generates an overflow signal Q which is fed to the CPU 4.

FIG. 2 shows the arrangement of the keys 2A on the keyboard 2 and also the arrangement of LEDs 3A-11 to 3A-26 of the guide LED array 3.

Figure 3A:
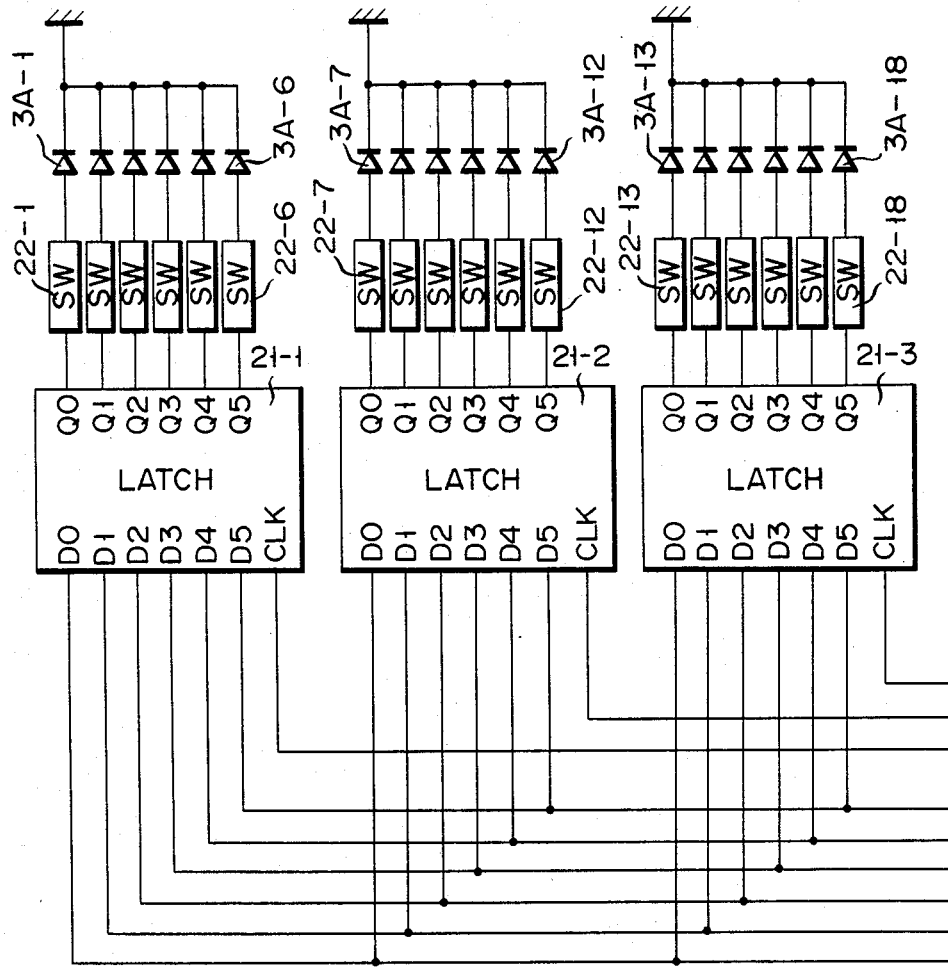
FIGS. 3A and 3B are connecting diagrams showing a LED array drive circuit.
Figure 3B:
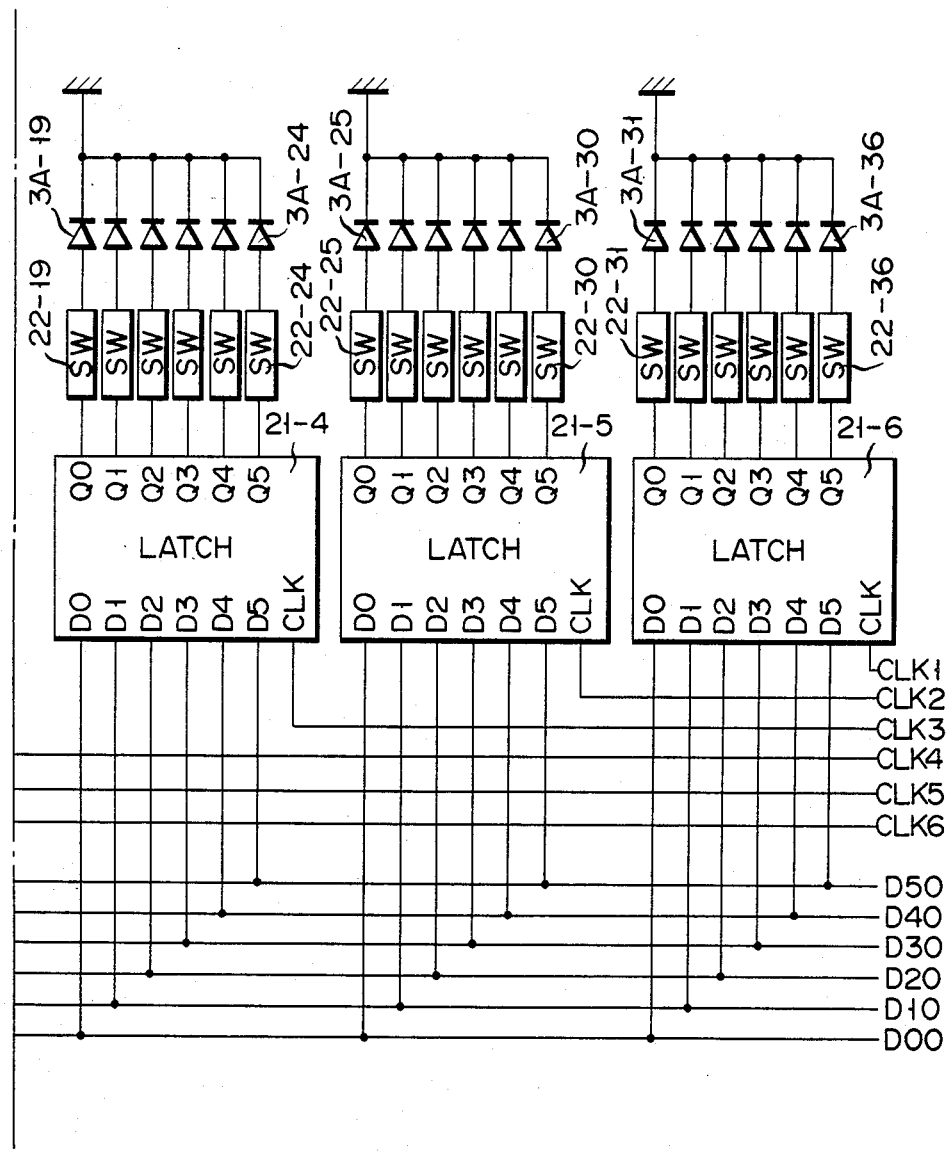

FIGS. 3A and 3B show the circuit construction of a drive circuit for the guide LED array 3. As is shown, 36 LED elements 3A-1 to 3A-36 are provided for the respective 36 keys on the keyboard 2. These LED elements are divided into six groups each of six elements. Latches 21-1 to 21-6 are provided for the respective groups of LED elements. Latch clocks CLK-1 to CLK-6 are sequentially provided from the CPU 4 to clock input terminals CLK of the respective latches 21-1 to 21-6. Data of 6 bits D00 to D50 for controlling the operation of the LEDs provided from the CPU 4 to the respective data input terminals D0 to D5 of each latch. Each latch has data output terminals Q0 to Q5 individually corresponding to the respective data input terminals D0 to D5. From each of these output terminals is provided an output signal of a binary logic level of "1" for the "on" state of the corresponding LED or of "0" for the "off" state of the LED. Switching circuits 22-1 to 22-36 are connected to the corresponding data output terminals Q0 to Q5 of the latches 21-1 to 21-6. Each of these switching circuits 22-1 to 22-36 is mainly made of a transistor and a resistor (not shown), and is turned on when a signal "0" is applied to the base of the transistor and turned off when a signal "1" is applied to the base of the transistor. The output signal is fed to the anode of the corresponding LED elements 3A-1 to 3A-36. The cathode of the LED elements 3A-1 to 3A-36 is grounded.

Figure 4:
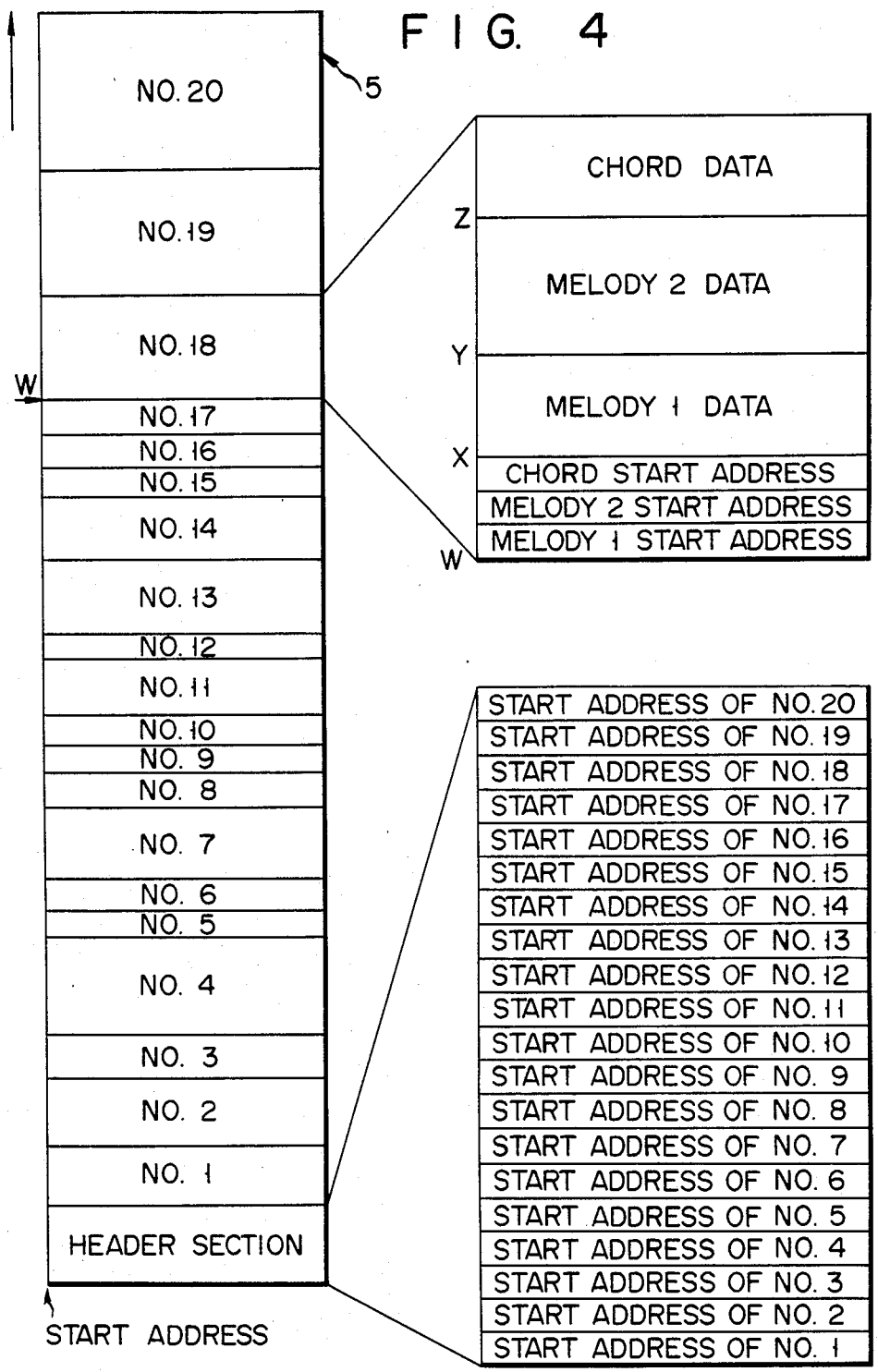
FIG. 4 shows the arrangement of data stored in an autoplay data ROM.

FIG. 4 schematically shows the arrangement of data stored in the autoplay data ROM 5. As is shown, a header section and data areas for the 1st to 20th musical pieces are provided as mentioned from the first address side. As is shown in an enlarged form, the header section has address data areas, in which the start addresses of the data for the 1st to 20th musical pieces are stored. Each musical piece data area has the configuration as typified in the enlargement of that of musical piece No. 18. In the area, the start address of melody 1, start address of melody 2, start address of chord, melody 1 data, melody 2 data and chord data are stored in the mentioned order from the side of the start address W of musical piece No. 18.

Figure 5:
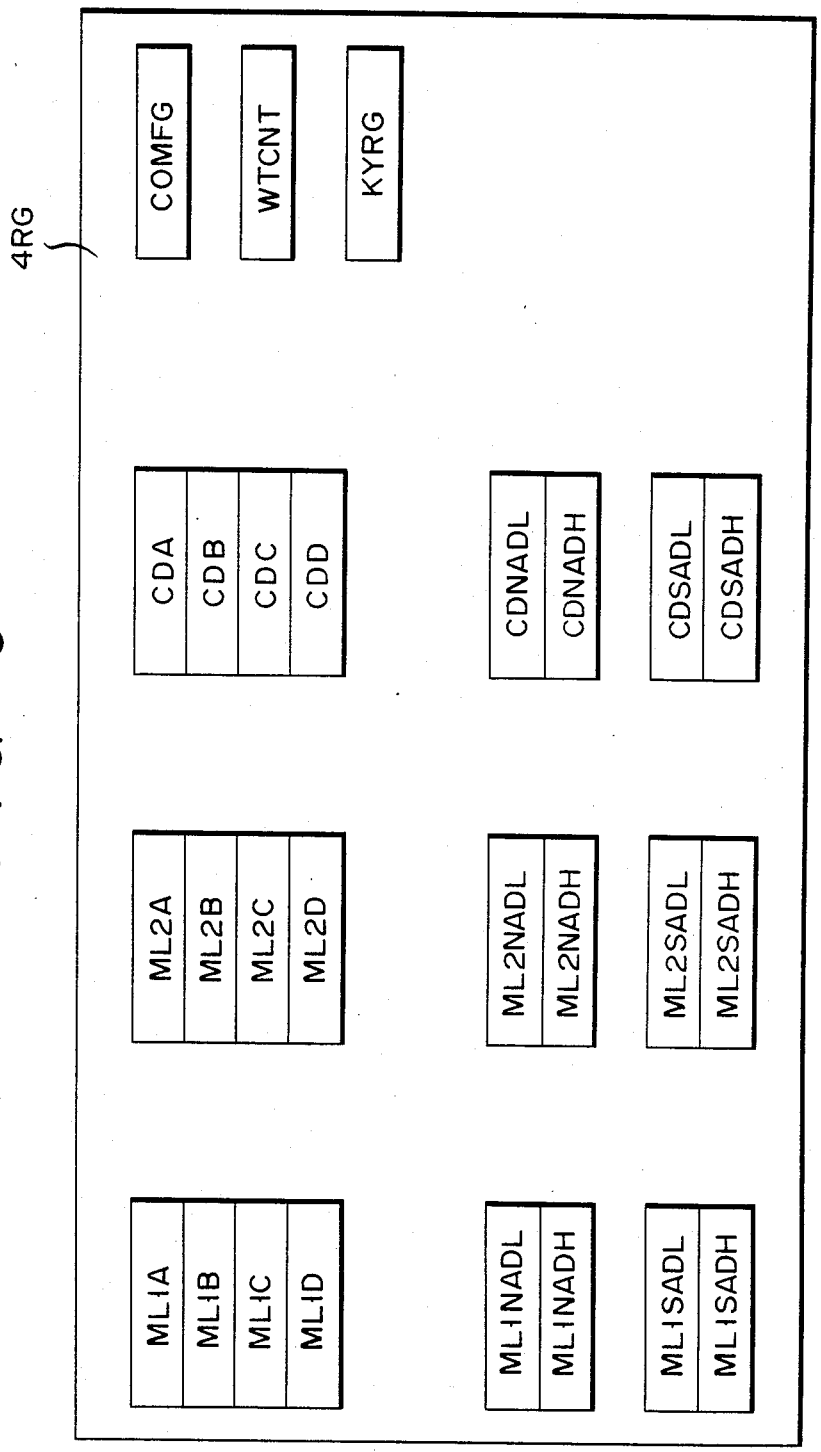
FIG. 5 shows a register section in a CPU.

FIG. 5 shows various registers constituting the register section 4RG in the CPU 4. 8-bit registers ML1A, ML1B, ML1C, ML1D, ML1NADL, ML1NADH, ML1SADL and ML1SADH are utilized to automatically play the melody 1. Data representing the pitch, tone duration and rest duration of the tone as it is made audible is set in the registers ML1A, ML1B and ML1C. Data representing the pitch of the next tone to be made audible is set in the register ML1D. Lower 8 bits and upper 8 bits of the address of the autoplay RAM 6 in which the pitch of the next tone to be processed are set in the respective registers ML1NADL and ML1NADH. Lower 8 bits and upper 8 bits of the first address of the RAM 6 in which melody 1 data has been stored are set in the respective registers ML1SADL and ML1SADH.

Registers ML2A, ML2B, ML2C, ML2D, ML2NADL, ML2NADH, ML2SADL and ML2SADH are utilized to automatically play the melody 2, and registers CDA, CDB, CDC, CDD, CDNADL, CDNADH, CDSADL and CDSADH are utilized to automatically play a chord. These registers have functions similar to the corresponding registers ML1A, ML1B, ML1C, ML1D, ML1NADL, ML1NADH, ML1SADL and ML1SADH.

A register COMFG stores various flags during autoplay. This register COMFG will be described later in detail with reference to FIG. 6. A register WTCNT has a function of counting waiting time, for which the start of the tone correspondig to the automatic playing of the melody 2 and chord is postponed when a key depression for a tone of the melody 1 is delayed more than necessary or regular key operation timing during autoplay. A register KYRG is one, in which the pitch of a depressed key is set.

Figure 6:
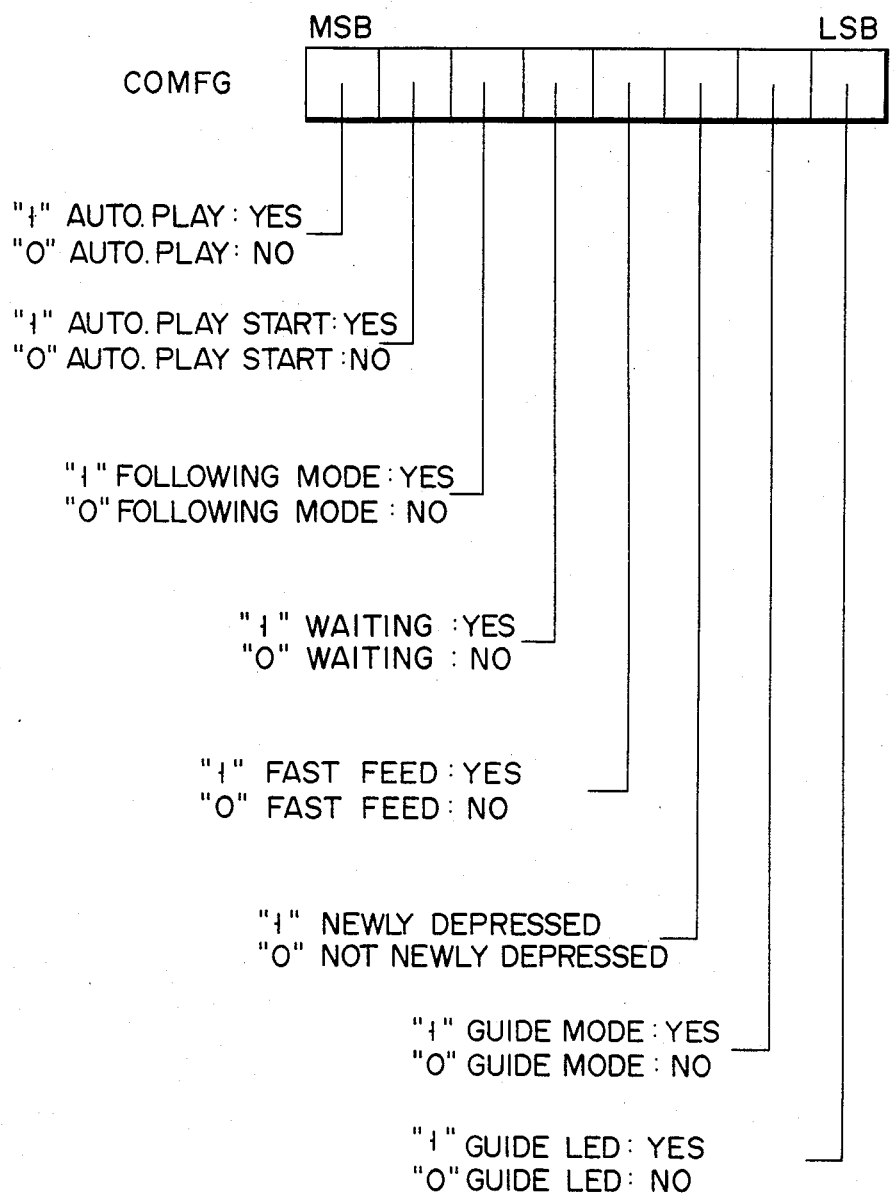
FIG. 6 shows a function of a register COMFG.

The contents of flags that are set in the individual bits of the register COMFG will now be described with reference to FIG. 6. In the most significant bit (MSB), data "1" is held while the autoplay is in force and data "0" is held while the autoplay is not inforce. In the 7th bit, data "1" is set immediately after the start of autoplay, and "0" is held when the opposite is true. In the 6th bit, data "1" is held when a following mode, in which the autoplay of the melody 2 and chords is provided to follow the operation of the melody 1 key, prevails during the automatic playing, and data "0" is held when the opposite is true. In the 5th bit, data "1" is held during the waiting time noted before, and data "0" is held when the opposite is true. In the 4th bit, data "1" is set when the audible melody 2 and chord is fastfed as when the timing of the key depression for the corresponding tone of the melody 1 is advanced, and data "0" is held in the opposite situation. In the 3rd bit, data "1" is set when the depression of a new key for the melody 1 is detected during autoplay, and data "0" is held when the opposite is true. In the 2nd bit, data "1" is held when a melody guide mode prevails, and data "0" is held in the opposite case. In the least significant bit (LSB), data "1" is held when the melody 1 guide switch is "on", and data "0" is held when it is off.

Figure 17A:
FIGS. 17A to 17C show a written example of a piece of music for autoplay.
Figure 17B:
Figure 17C:
Figure 18:
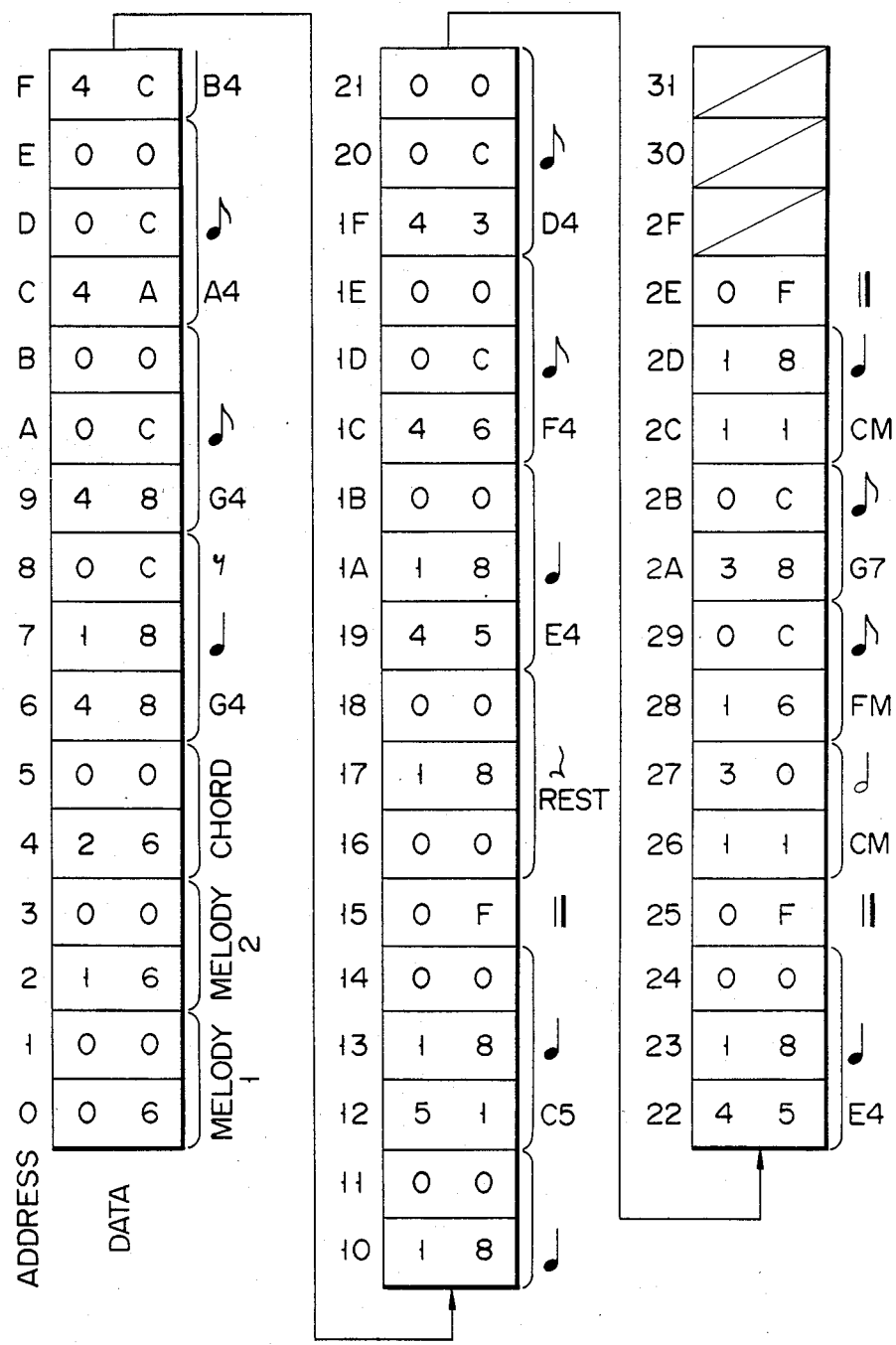
FIG. 18 shows data for the autoplay musical piece shown in FIGS. 17A to 17C.

The operation of the embodiment having the above construction will now be described. The operation will be described in connection with the case as shown in FIGS. 17A to 17C, regarding the automatic playing of musical piece No. 18 stored in the autoplay data ROM 5. FIG. 18 shows a specific form of data, in which the musical piece noted above is stored in the ROM 5. The data shown in FIG. 18 will first be described. For the sake of simplicity, the first address of the area in which the musical piece noted above is stored is assumed to be address 0. The numerals shown in FIG. 18 are represented by hexadecimal notations. The respective address areas each has a memory capacity of 1 byte (8 bits).

A 4-bit start address data "0006" is stored in addresses 1 and 0. Start address data "0016" and "0026" of the melody 2 and chord is stored in addresses 3 and 2, and in addresses 5 and 4, respectively. Data for the melody 1 tones is stored successively in the addresses following the address 6 generally using three addresses. This will now be described in greater detail. The first tone in the melody 1, for instance, is a quarter note G4 followed by an eighth-rest. The tone data is stored first as pitch data, then as tone duration data and rest duration data, as shown in FIG. 13. The pitch data of 8 bits consists of octave data occupying the upper 4 bits and note data occupying the lower 4 bits. The note data, octave data, tone duration data and rest duration data are specifically shown in FIG. 14. In the note data, data "0" represents a rest; data "1" to "C" represent notes C to B; data "D" and "E" represent no operation code; and data "F" represents an end mark indicative of the end of the melodies and chord. The data "F" is usually represented as "0F" of 8 bits.

As octave data, data "0" to "F" represent 0th to 15th octaves. Frequencies of note A are shown as an example for the 1st to 9th octaves in FIG. 14. The 1st octave (A1) frequency is 55 Hz, the 2nd octave frequency is double the frequency of 55 Hz, and so forth, up to 256 times the frequency of 55 Hz. As for the tone and rest duration data, the shortest tone or rest duration which corresponds to 1/24 of the quarternote or quarter-rest, is represented by data "01", the eighth-note or eighth-rest is represented by "0C", the quarter-note or quarter-rest is represented by "18", and so forth, and the longest tone or rest duration which corresponds to double the whole note or rest is represented by "C0".

With the above definitions of the data for the pitch, tone duration and rest duration, the first tone of the melody 1 data "48" representing note G4, data "18" representing a quarter-note duration, and data "0C" representing a quarter-rest duration are stored in the respective addresses 6, 7 and 8 in FIG. 18. For the second to fifth tones, data is similarly stored in an area covering three addresses for each tone in addresses 9 through 14. An end mark data "0F" is stored in address 15.

Data for the melody 2 tones is stored in the same manner as for the melody 1 in addresses 16 through 25. Likewise, data for the chord tones is stored in addresses 26 through 2E. Each chord tone data has a configuration as shown in FIG. 15. More specifically, it is an 8-bit data consisting of kind of chord data occupying the upper 4 bits and root data occupying the lower 4 bits. The kind of chord data and root data are specifically shown in FIG. 16. As for the kind of chord data, data "1" to "8" represent the respective kinds of chords from "major" to "diminished". Data "0" and "9" to "F" are nonoperation codes. The root data is the same as the melody note data.

To describe the automatic playing of the autoplay musical piece, shown in FIGS. 17A to 17C, that is stored in the form as described above in the ROM 5, it is assumed, for instance, that the melody guide mode and guide LED mode are "on" while the following mode is "off". In this case, the melody 1 is not automatically played but the LEDs are turned off and on according to the pitch and tone duration data of the melody 1 set in the RAM 6. The melody 2 and the chord, on the other hand, are automatically played at a predetermined tempo. Further, rhythm is sounded at predetermined tempo. The melody guide mode and guide LED mode are turned "on" by turning on the guide mode switch, and the first and second guide LED switches. The following mode is turned "off" by turning off the following mode switch. The CPU 4 judges the states of these switches and writes flag "0" in the 6th bit of the register COMFG and "1" in the 2nd bit and LSB thereof.

When the switch operation for selecting the autoplay musical piece No. 18 is executed, the CPU 4 addresses the autoplay data ROM 5, reads out the data for piece No. 18, i.e. the data shown in FIG. 18, and writes the readout data in the autoplay data RAM 6. Then, the desired timbre is designated by operating the corresponding timbre designation switch. Further, the desired tempo is set by operating the tempo control knob, thus setting the corresponding counting speed of the timer 18. Thereafter, the autoplay start/stop switch is turned on to couple an autoplay start command. As a result, the autoplay of the piece shown in FIGS. 17A to 17C is started. The player starts operating the keyboard 2 while listening to the tones of the melody 1 of the autoplay musical piece No. 18.

The overall operation of the whole electronic musical instrument will now be described with reference to the general flow chart of FIG. 7.

A pre-processing step G1 is executed when the power source of the instrument is turned on. This step is an initializing step, in which the individual registers in the register section 4RG in the CPU 4 are cleared, and the melody 1 tone generating circuit 14, melody 2 tone generating circuit 15 and autoplay accompaniment tone generating circuit 19 are initialized. When this initializing step is over, a step G2 is executed, in which keyboard scan or search and flag setting are done. More specifically, the CPU 4 provides the scan signal C to the keyboard 2 and receives an output signal D from the individual keys. Also, it effects the necessary flag setting to supply commands for making the tone of the operated keys of the melody 1 tone generating circuit 14 audible. When this step of the process with respect to the keyboard 2 is over, the CPU 4 makes a similar scan and flag setting with respect to the switch input section 1 (step G3). As a result, the instrument is played according to changes in the on-off states of the switches.

In a subsequent step G4, a check is done as to whether overflow signal P has been provided from the timer to set the tempo. If no overflow signal has been provided, a step G6 is executed, in which a check is done as to whether the power source is "off". If it is detected in the step G4 that the overflow signal P has been provided, a step G5, which is an autoplay routine, is executed, and then the operation goes on to the step G6. In the autoplay routine of the step G5, the melody 1, melody 2 and chord data for piece No. 18 in the RAM 6 are processed in the respective melody 1 tone generating circuit 14, melody 2 tone generating circuit 15 and autoplay accompaniment tone generating circuit 19. The tone signals thus generated are coupled through the respective amplifiers 10, 16 and 17 to the adder 11 to be mixed. The resultant signal is fed through the amplifier 12 to the loudspeaker 13 to be made audible.

If it is detected in the checking of the step G6 that the power source is not "off", the operation is returned to the step G2, that is, the steps G2 through G5 are repeatedly executed. If it is detected that the power source is "off", a step G7 of the postprocessing is executed.

Figure 8A:
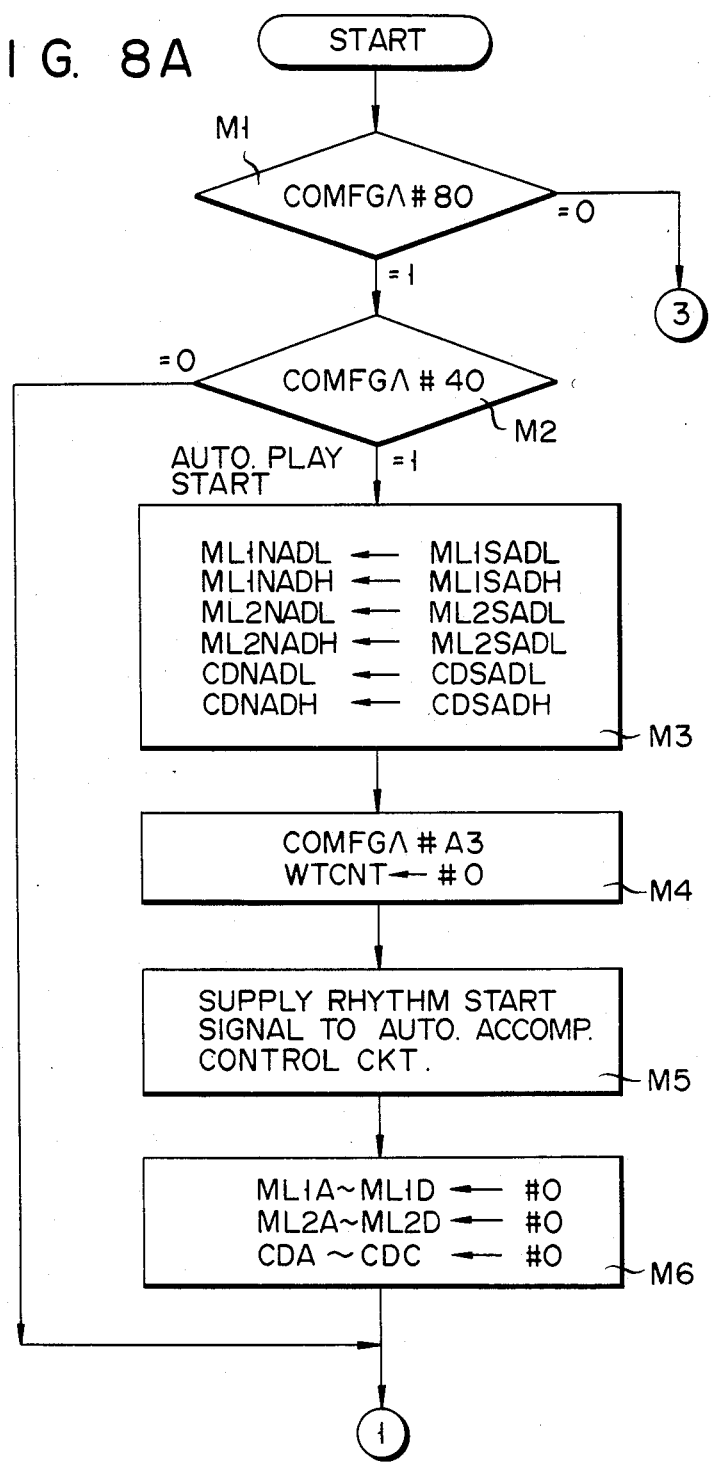
FIGS. 8A to 8C constitute a flow chart illustrating an autoplay routine.
Figure 8B:
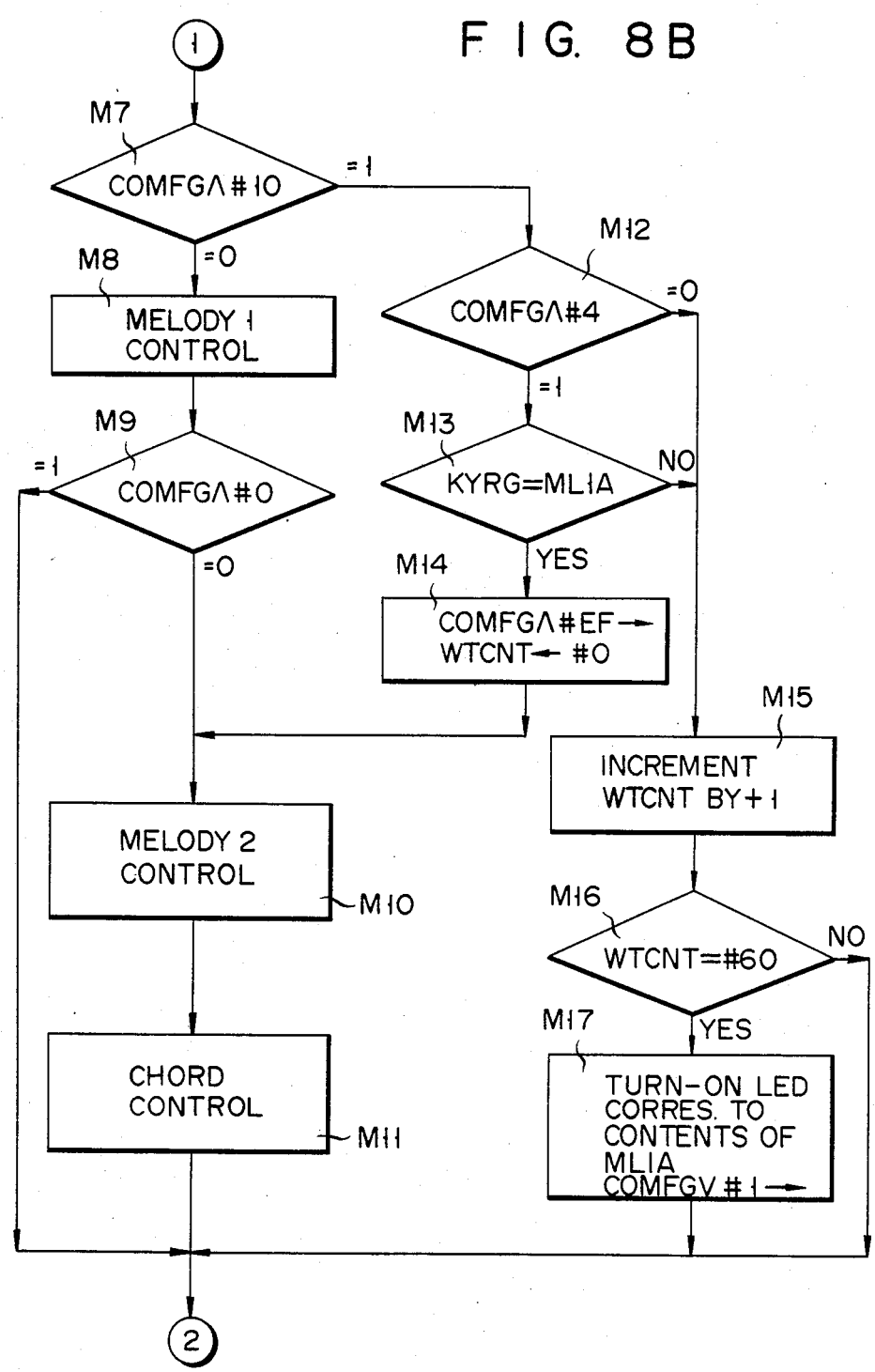
Figure 8C:
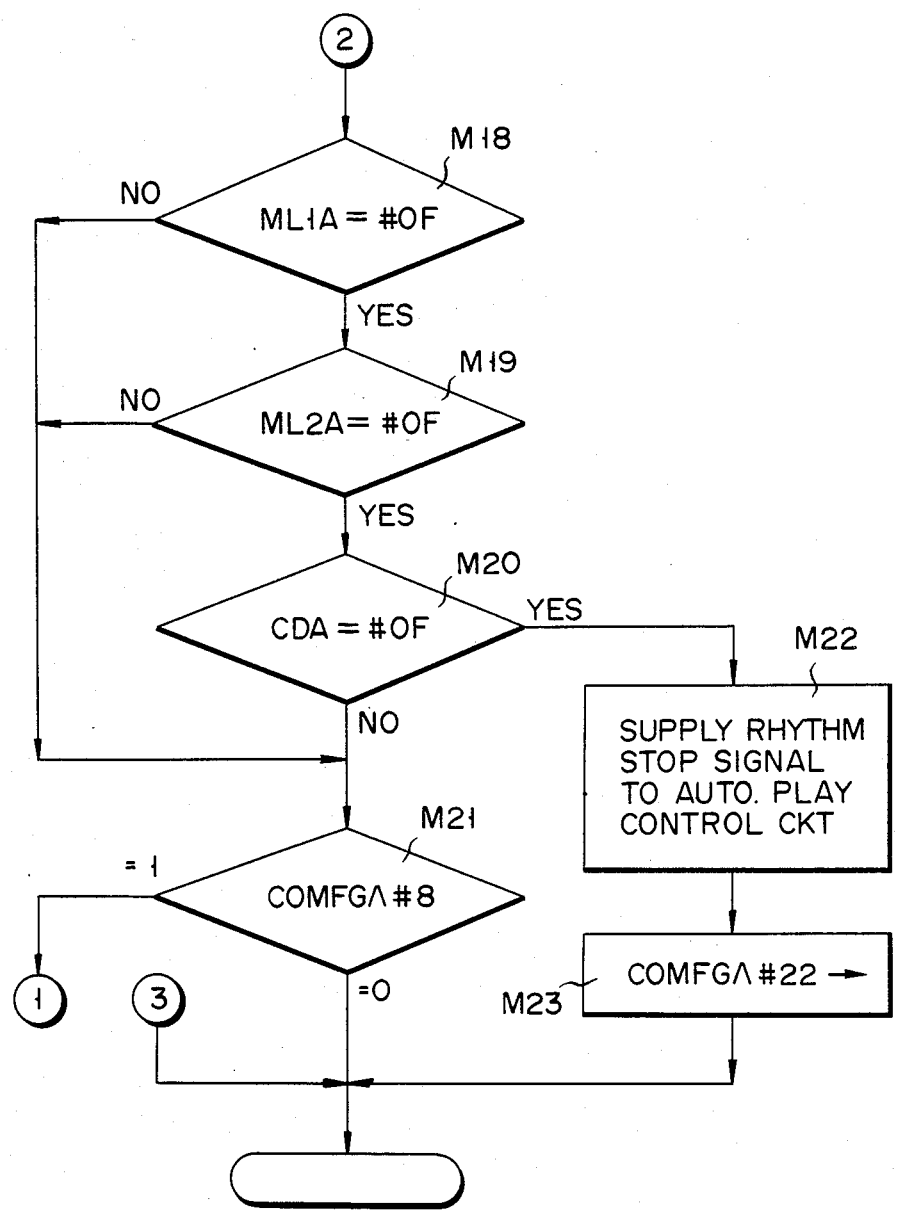

The step G5 of the autoplay routine will now be described in detail with reference to the flow charts of FIGS. 8A through 12. FIGS. 8A to 8C show the general flow chart of the autoplay routine. FIGS. 9A to 9C, 10 and 11 are flow charts of melody 1 control, melody 2 control and chord control, respectively. FIG. 12 is a flow chart showing how the flicker operation of the guide LED array 3 is controlled according to an overflow signal Q provided from the timer 19.

With the start of the routine of FIGS. 8A to 8C, a check as to whether the autoplay is in force is done in a step M1. For this check, the 8-bit data in the register COMFG and data "80" (which is a hexadecimal data) are ANDed, that is, it is checked whether or not the MSB of the data in register COMFG is "1". In other words, it is checked whether or not the result is "0" (indicating that the autoplay is not in force) or not "0" (indicating that the autoplay is in force). The present data in the register COMFG is "11000011". As is seen from FIG. 6, the MSB of "1" indicates that the autoplay is in force, the 7th bit of "1" indicates the autoplay start, the 2nd bit of "1" indicates that the guide mode is "on", and the LSB of "1" indicates that the melody 1 guide switch is "on". The other bits are all "0". The data in the register COMFG corresponds to hexadecimal data "C3". Thus, the results of the AND operation of this data and data "80" are not "0", that is, it is determined that the MSB is "1", so that the routine goes to a step M2.

In the step M2, the data in the register COMFG and data "40" are ANDed, that is, a check is done as to if the 7th bit of the data in the register COMFG is "1". If the result is "0", it means that the autoplay will not start. If it is "1", it means that the autoplay will start. Since the 7th bit is "1", indicating that the autoplay has started, the routine goes to a step M3.

In the step M3, the start addresses "0006", "0016" and "0026" of the melody 1, melody 2, and chord data in the registers ML1SADL, ML1SADH, ML2SADL, ML2SADH, CDSADL and CDSADH (see FIG. 18), are loaded into the corresponding registers ML1NADL, ML1NADH, ML2NADL, ML2NADH, CDNADL and CDNADH.

The routine then goes to a step M4, in which the data in the register COMFG and data "A3" are ANDed, and the result is written in the register COMFG. That is the data in the register COMFG is updated by new data "10000011" (which corresponds to "83" in hexadecimal form). The autoplay start flag of the 7th bit is thus reset to "0". In addition, the register WTCNT is cleared.

The routine then goes to a step M5, in which the CPU 4 provides a rhythm start signal to the autoplay accompaniment control circuit 8. The rhythm start signal commands the start of the reading of the autoplay accompaniment pattern of the designated rhythm from the ROM 7.

The routine then goes to a step M6, in which the registers ML1A to ML1D, ML2A to ML2D, and CDA to CDC are cleared. The routine then goes to a step M7 shown in FIG. 8B, in which the data "83" in the register COMFG and data "10" are ANDed, that is, a check is done as to whether the flag of the 5th bit, indicating a waiting state, is "1". Since it is "0", it is determined that the waiting states do not prevail. The routine thus goes to a step M8 of the melody 1 control, which will now be described in detail with reference to the flow chart of FIGS. 9A to 9C.

In the melody 1 control routine, a step N1 is first executed, in which a check is done as to whether the data in the register ML1A is equal to "OF". Since the register ML1A has been cleared in the step M6 noted above and contains data "00", the two pieces of data do not coincide, so that the routine goes to a step N2. In the step N2, a check is done as to if the data in the register ML1B is all "0" data. Since this register has been cleared in the step M6, the result is "YES", and so the routine goes to a step N3.

In the step N3, the data "83" in the register COMFG and data "2" are ANDed, that is, a check is done as to if flag of the 2nd bit, indicating the guide mode, is "1". Since this bit is "1", it is determined that the guide mode is "on", so that the routine goes to a step N5. In the step N5, the LED corresponding to the data in the register ML1A is turned off. This moment is still at the start of the autoplay, and the CPU 4 is providing all "1" data D00 to D50 (see FIG. 3) to the guide LED array 3. The all "1" data is fed to the data input terminals D0 to D5 of all of the latches 21-1 to 21-6 to have all the LED elements 3A-1 to 3A-36 "off".

The routine then goes to a step N6, in which a check is done as to whether the data in the register ML1C is all "0" data. Since it is all "0" data, the result is "YES", so that the routine goes to a step N8. In the step N8, the data "83" in the register COMFG and data "2" are ANDed. Thus, like the case of the step N2, the routine goes up to a step N13. In the step N13, the data "83" in the register COMFG and data "20" are ANDed, that is, a check is done as to whether the result is not "0", indicating the following mode, or "0", indicating the absence of the following mode. Since in the instant case the following mode is "off" and the 6th bit of the data in the register COMFG is "0", the routine goes to a step N15.

In the step N15, 4-byte data is read out from the address "0006" of RAM 6 as indicated by the data in the registers ML1NADL and ML1NADH (i.e, start address of melody 1 data), that is, data "48" representing the note G4 of the present tone to be sounded, data "18" representing the quarter-note duration, data "OC" representing the eighth-rest duration, and data "48" representing the note G4 of the next tone to be sounded, are read out from the respective addresses 6, 7, 8 and 9, as shown in FIG. 18, and these data are written into the corresponding registers ML1A to ML1D. After this has been done, the address data "09" and "00" of the next tone in the melody 1 are set in the registers ML1NADL and ML1NADH.

Figure 9A:
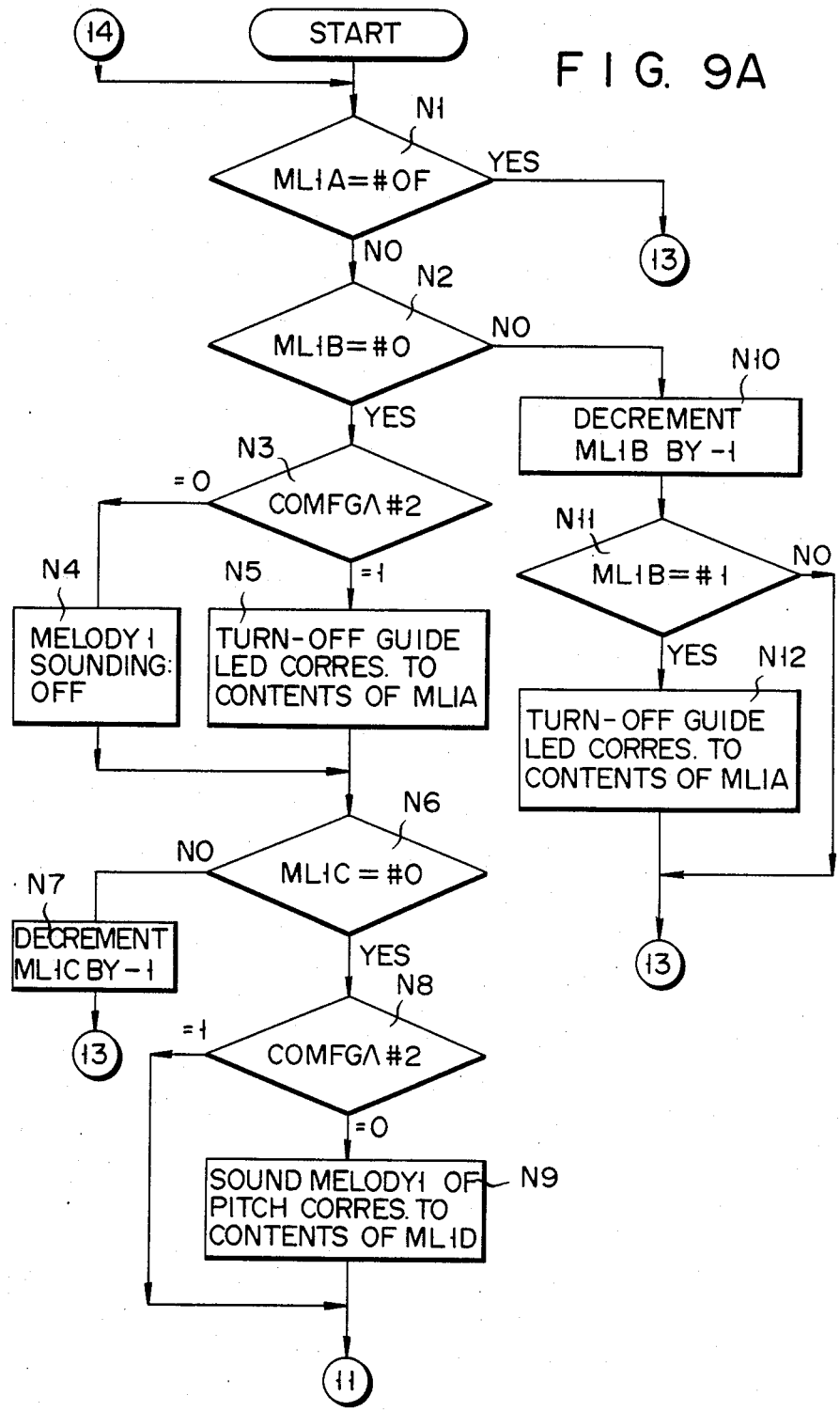
FIGS. 9A to 9C constitute a flow chart illustrating a melody 1 autoplay subroutine.
Figure 9B:
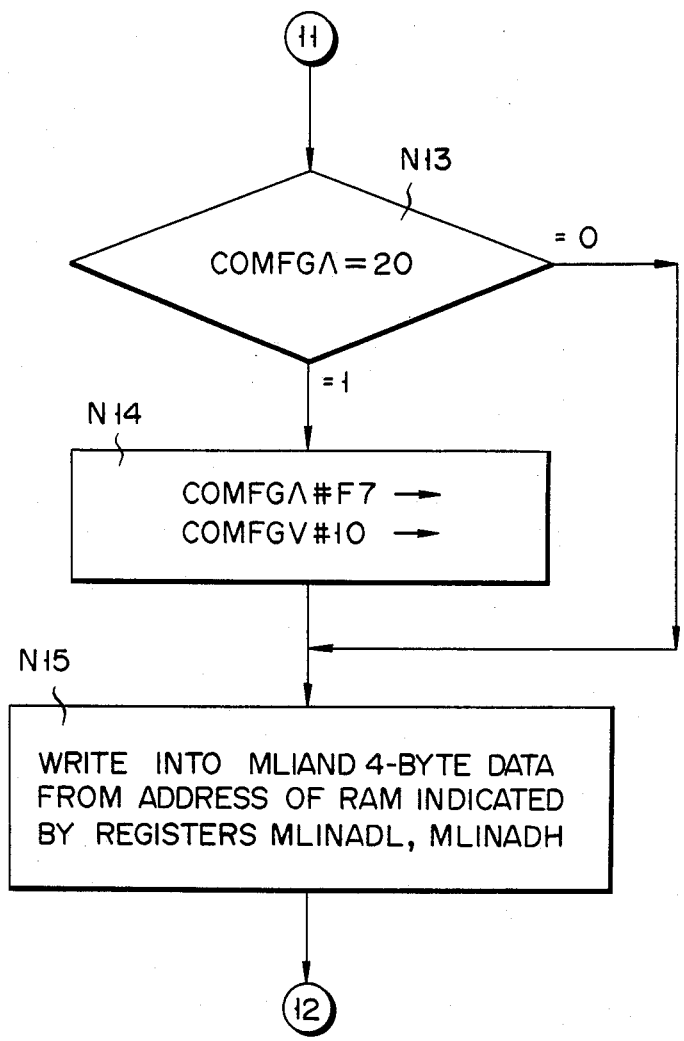
Figure 9C:
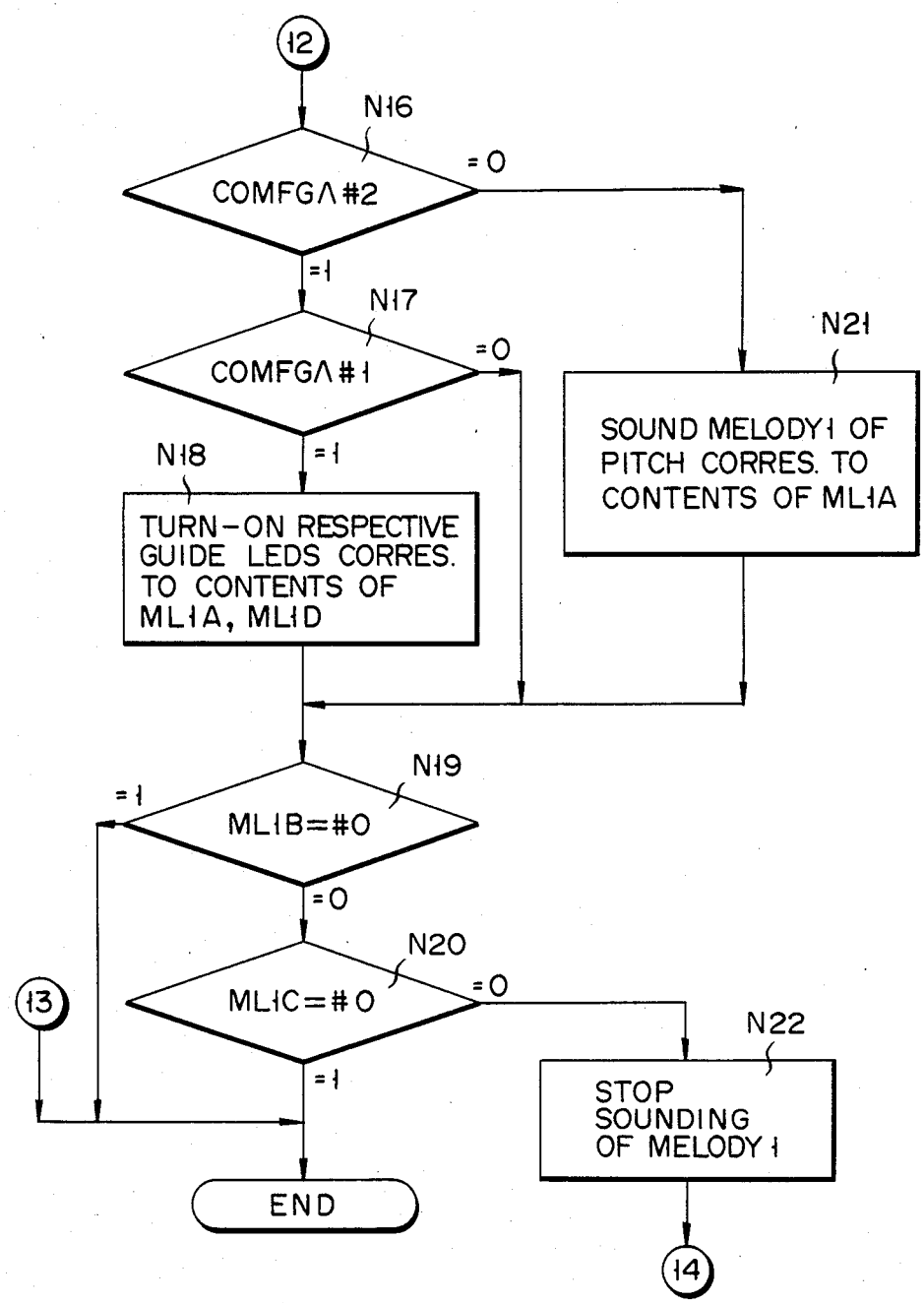

The routine then goes to a step N16 of FIG. 9C, in which the data "83" in the register COMFG and data "2" are ANDed, that is, a check is done as to if the result is not "0", indicating the presence of the guide mode. Since the guide mode prevails, the routine then goes to a step N17, in which the data "83" in the register COMFG and data "1" are ANDed, that is, a check is done as to whether the result is not "0" indicating that the guide LEDs are provided or not. Since the melody 1 guide LEDs are provided, the routine then goes to a step N18. In the step N18, LED elements corresponding to the data which is set in the registers ML1A and ML1D and which represents the note G4, are turned on. If the LED element 3A-20 (FIG. 3) corresponds to the note G4, 6-bit data, in which only the bit D1O among the bits D00 to D50 is "0", is provided from the CPU 4 at the timing of the clock CLK-3 to be latched in the latch 21-4. As a result, only switching circuit 22-20 is turned on to turn on the LED element 3A-20. Thus, the note G4 is indicated. In the instant case, the note of the next tone to be sounded is also G4, so that only a single LED element is turned on. However, of the LED elements which are turned on in this way, the one that indicates the note of the next tone to be sounded is caused to flicker through the execution of the guide LED array on-off control, which will be described later with reference to the flow chart of FIG. 12, every time an overflow signal Q is provided from the timer 19.

The routine then goes to a step N19, in which a check is done as to if the data (i.e., tone duration data) in the register ML1B is "0". The data is "18" and not "0", thus bringing an end to the melody 1 control routine. At this moment, the sound of the first tone is started by depressing the key for the note G4 in the melody 1. The routine then goes to a step M9 shown in FIG. 8B, in which the data "83" in the register COMFG and data "10" are ANDed, that is, a check is done as to whether the result is not "0", indicating the waiting state, or not. Since the 5th bit is "0", it is determined that the waiting state does not prevail. The routine thus goes to a step M10 of melody 2 control.

Figure 10:
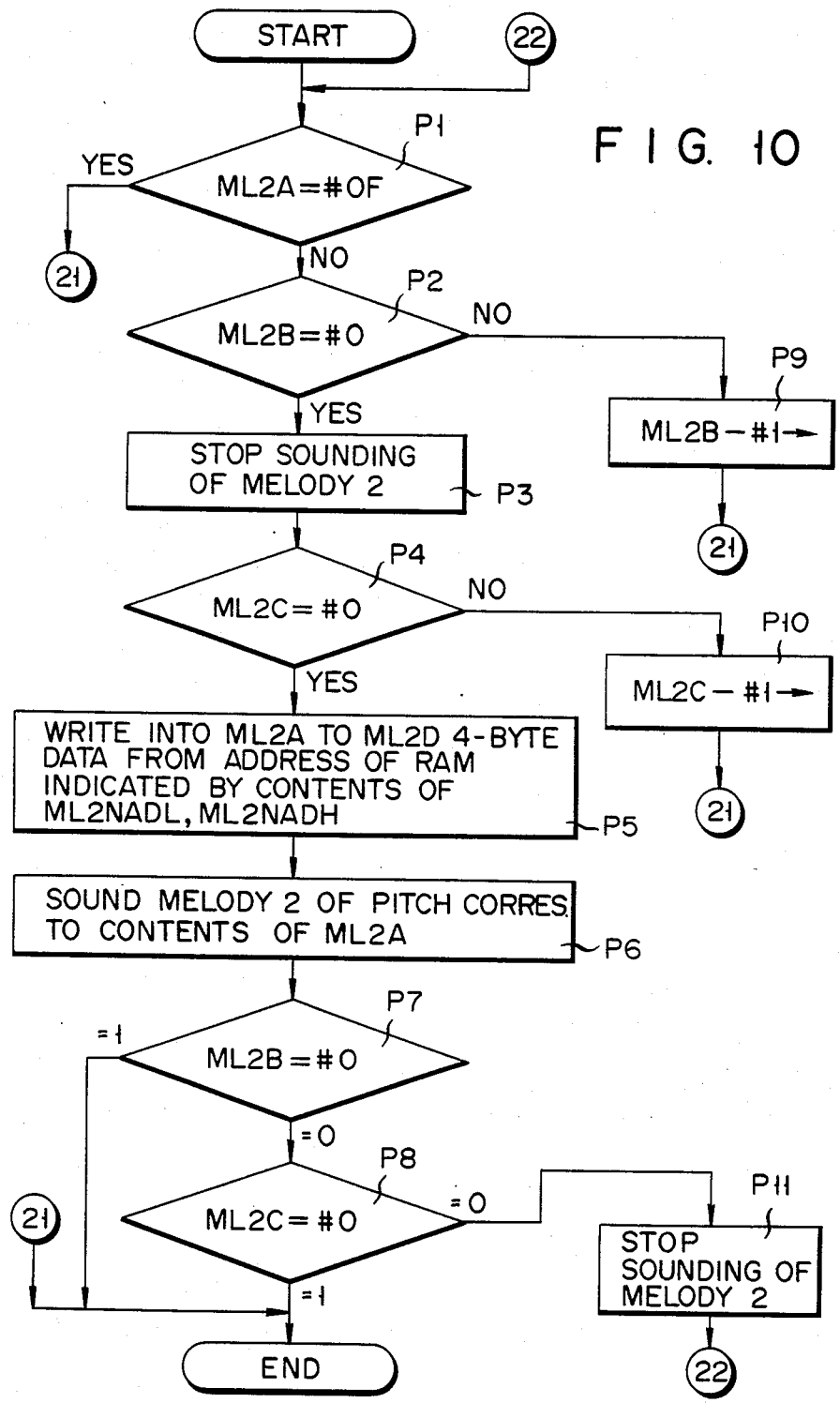
FIG. 10 is a flow chart illustrating a melody 2 autoplay subroutine.

The routine of the melody 2 control is as shown in the flow chart of FIG. 10. In this routine, a step P1 is first executed, in which a check is done as to whether the data in the register ML2A (which is now "00" as the result of processing in the step M6 in FIG. 8) coincides with data "OF" representing an end mark. Since the two data do not coincide, the result is "NO", so that the routine goes to a step P2. In the step P2, a check is done as to whether the data in the register ML2B is all 8-bit "0" data. Since the data is all 8-bit "0" data, the tone duration data is determined to be "0", and the routine goes to a step P3. In the step P3 the operation for turning off the sound of the tone of the melody 2 is executed. This present state corresponds to a state before hearing the sound of the first tone.

The routine then goes to a step P4, in which a check is done as to if the data in the register ML2C is all 8-bit "0" data. Since it is all 8-bit "0" data, the result is "YES", so that the routine goes to a step P5. In the step P5, 4-byte data is read out from the address of RAM 6 specified by the data in the registers ML2NADL and ML2NADH, i.e., address 16 constituting the start address of melody 2 and the following addresses of the RAM 6. That is, data "00" in address 16 represents the tone to be heard, in the instant case, a rest; data "18" in address 17 represents the quarter-rest duration; data "00" in address 18 represents a rest; and data "45" in address 19 represents the note E4 of the next tone to be heard. As shown in FIG. 18, all these data are read out, and are written into the corresponding registers ML2A to ML2D. After this process has been done, addresses "19" and "00" of the next tone of the melody 2 are set in the registers ML2NADL and ML2NADH.

The routine then goes to a step P6, in which the sound of tone corresponding to the data in the register 2A is heard. Since the first tone of the melody 2 is a quarter-rest, no tone is actually heard. The routine then goes to a step P7, in which a check is done as to if the data in the register ML2B is "0". The data is not "0", thus bringing an end to the melody 2 control routine, and the routine goes to a step M11 in FIG. 8B, which is a chord control routine.

Figure 11:
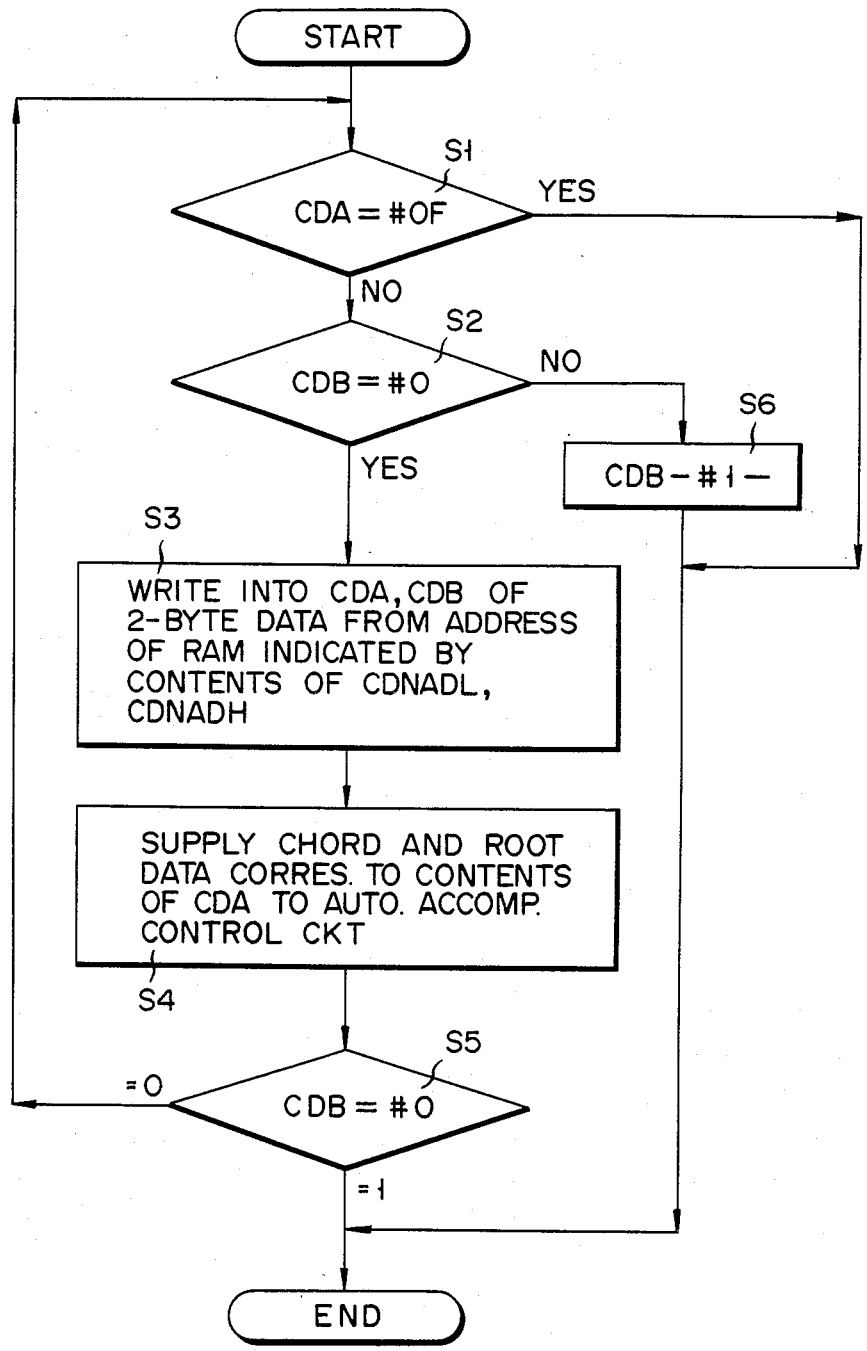
FIG. 11 is a flow chart illustrating a chord autoplay subroutine.
Figure 12:
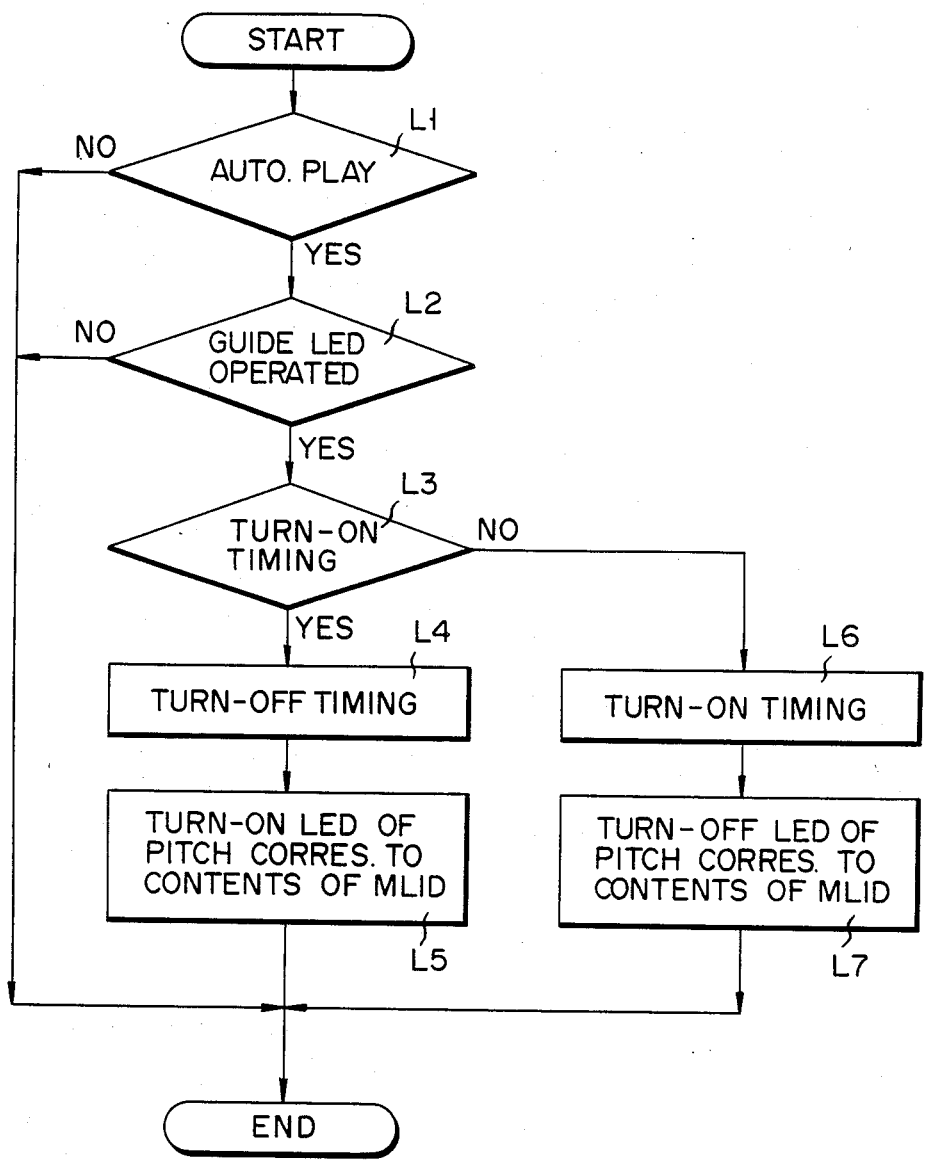
FIG. 12 is a flow chart illustrating an LED flickering subroutine.

The chord control routine of the step M11 is shown in detail in the flow chart of FIG. 11. In this routine, a step S1 is first executed, in which a check is done as to whether the data in the register CDA is equal to the data "OF" representing the end mark. Since the data in the register CDA is all 8-bit "0" data due to the processing in the step M6 in FIG. 8A, the result of the check is "NO", and the routine goes to a step S2. In the step S2, a check is done as to whether the data in the register CDB is 8-bit all "0". Since it is all 8-bit "0", the result of the check is "YES", so that the routine goes to a step S3. In the step S3, 2-byte data is read out from the addresses of RAM 6 that is set in the registers CDNADL and CDNADH, i.e., address 26 constituting the chord start address and the following addresses in the RAM 6, that is, data "11" in address 26 representing note Cmaj (CM) and data "30" in address 27 representing a half-note duration, as shown in FIG. 18, are read out, and these data are written into the registers CDA and CDB. The routine then goes to a step S4, in which the data "11" set in the register CDA is fed to the automatic accompaniment control circuit 8, whereby the sound of the chord Cmaj is heard. Through the processes described above, the melody 1, melody 2 and chord data of the first tone of the music are heard simultaneously.

The routine then goes to a step S5, in which a check is done as to whether the data in the register CDB is "0". It is not "0", thus bringing an end to the chord control routine, and the routine goes to a step M18 in FIG. 8C. If the data in the register CDB is found to be "0" in the step S5, it means that the chord is continuous. At the end of the step S5, the addresses "16" and "0C" of the next chord to be heard, i.e., chord Fmaj, are set in the registers CDNADL and CDNADH.

In the step M18, a check is done as to whether the data in the register ML1A is "OF" representing the end mark. Since it is "48", the result is "NO", so that the routine goes to a step M21. In the step M21, the data "83" in the register COMFG and data "8" are ANDed, that is, a check is done as to if the fastfeed is in force. In the instant case, the result is "NO", thus bringing an end to the present autoplay routine of the step G5.

Figure 7:
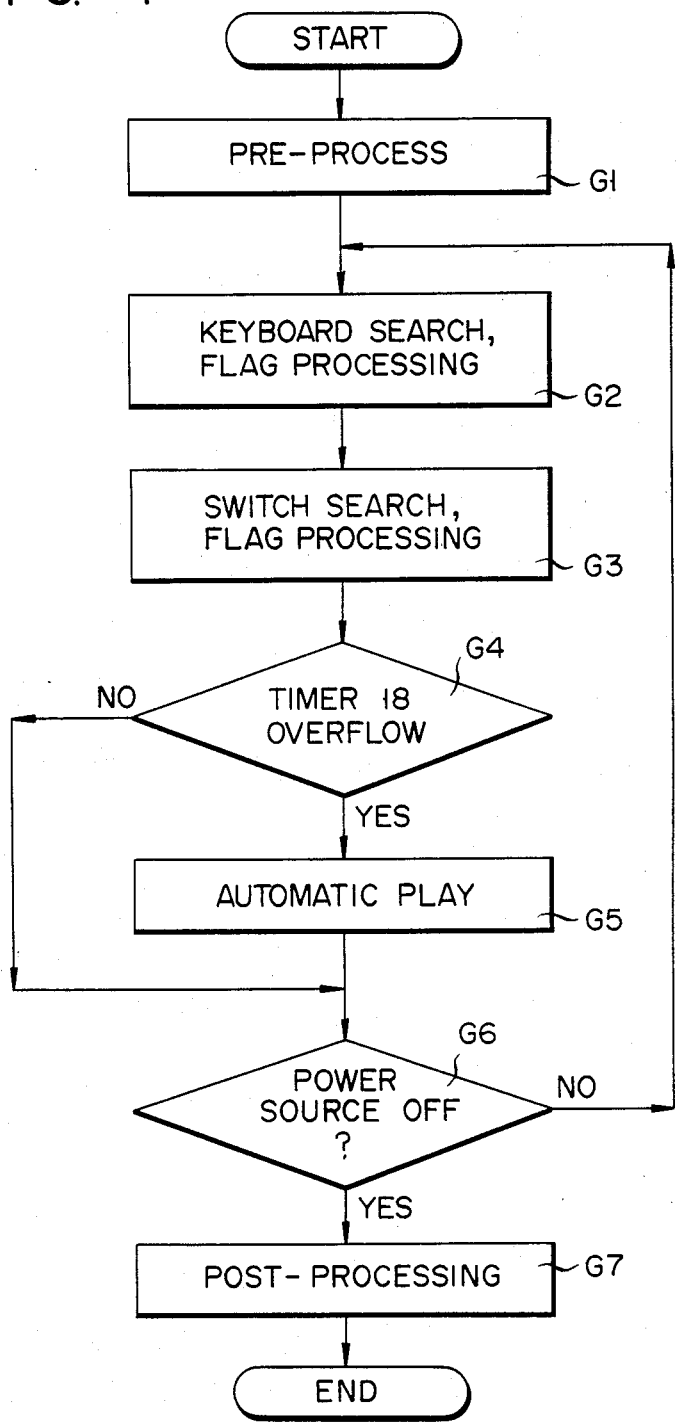
FIG. 7 is a general flow chart illustrating the routine for autoplay by the electronic musical instrument.

While the routine of the step G5 has been completed once after the start of the autoplay, if it is determined in the step G4 in the flow chart of FIG. 7 that an overflow of the timer 18 for setting the tempo has occurred due to the lapse of time corresponding to 1/24 of a quarter-note, the second autoplay routine of the step G5 is executed. In this case, the step M2 executed subsequent to the step M1 in FIG. 8A yields "0" as the result of ANDing the data "83" in the register COMFG and data "40", so that the routine goes to the step M7 in FIG. 8B. In the step M7 it is determined that the waiting state is not in force, so that the routine goes to the step M8, i.e., the melody 1 control routine described above is executed. In the subsequent step M9 it is determined that the waiting state is not in force, so that the step M10, i.e., the melody 2 control routine, is executed. Then the step M11, i.e., the chord control routine, is executed. The routine then goes to the step M18 in FIG. 8C. Since the melody 1 is not over yet, the routine goes to the step M21, thus bringing an end to the autoplay routine.

The steps M1, M7, M8, M9, M10, M11, M18 and M21 are executed once every time an overflow signal P is generated from the timer 18. Consequently, the melody 1, melody 2 and chord of the autoplay music piece shown in FIGS. 17A to 17C are automatically played following the music score from the first tone. If it is determined in the step M18 in the flow chart of FIG. 8C that the melody 1 has ended, that is the data ANDed is the end mark data "OF" in address 15 of the RAM 16 as shown in FIG. 18, the step M19 is executed for checking for the end mark data "OF" with respect to the melody 2. If the end mark is detected, the end mark data "OF" is checked for the chord in the next step M20. If the end mark is detected, the routine goes to a step M22, in which the CPU 4 provides a rhythm stop signal to the autoplay accompaniment control circuit 8 to stop the automatic playing of the rhythm. In the next step M23, the data "83" in the register COMFG and data "22" are ANDed, and the result data "02" is fed to the register COMFG to reset the autoplay flag. When this is done, the subsequent execution of the step M1 in the flow chart of FIG. 8A immediately brings an end to the autoplay routine of the step G5, i.e., the step G5 is skipped, that is, the autoplay is interrupted.

Now, the processing of tone duration data in the melody 1 control routine shown in FIG. 9A to 9C will be described. It is assumed that the melody 1 data for the first tone has been read out from the RAM 6, and that quarter-note data "18" has been set in the register ML1B. Thus, the result of the checking in the step N2 is "NO", so that the routine goes to a step N10, in which the data in the register ML1B is decremented by 1. In the next step N11, a check is done as to whether the data in the register ML1B has become 1. In the instant case, the result of the check is "NO", thus bringing an end to the melody 1 control routine. The steps N1, N2, N10 and N11 are executed every time an overflow signal P is provided from the timer 18. The data in the register ML1B is decremented one by one in this way. When the data in the register ML1B has been reduced to "1", this is detected in the step N11, so that the routine goes to a step N12. In the step N12, the LED element 3A-20 which has been on indicating the note G4 corresponding to the data "48" in the register ML1A, is turned off.

After the data in the register ML1B has been made "0" in the step N10, this is detected in the step N2 in the next execution, so that the routine goes to the step N3 and then to the step N5. In the step N5, the LED element 3A-20 corresponding to the note G4 is continually held "off". In the check in the next step N6 as to whether the data in the register ML1C is "0", the result is "NO" since the data is the eighth-rest duration data "0C", so that the routine goes to the step N7. In the step N7, the data "0C" in the register ML1C is decremented by 1, bringing an end to the pertinent routine of the melody 1 control. Subsequently, the steps N1, N2, N3, N5, N6 and N7 are executed in every melody 1 control routine. In every routine, the rest duration data noted above is decremented by 1. During the formation of the eighth-rest duration for the first tone, since no key is operated, the first tone is not heard. When the rest duration data in the register ML1C is decremented to "0", this is detected in the step N6, so that the routine goes to the step N8. Then, subsequent to the step N13 the routine goes to the step N15, in which the data "48", "0C", "00", and "4A" in the respective addresses 9, A, B and C in the RAM 6 for the second tone of melody 1 are set in the registers ML1A to ML1D. Subsequently, like in the case of the routine for the first tone, the steps N16, N17, N18 and N19 are executed, so that the LED elements corresponding to the notes G4 and A4 set in the registers ML1A and ML1D are turned on. Also, the sound of the second tone is started by depressing the key for G4. The LED element corresponding to the tone G4 being sounded is held "on", while the LED element corresponding to the note A4 of the third tone to be sounded next is flickered.

The tone duration data processing in the melody 2 control will now be described with reference to the flow chart of FIG. 10. After the quarter-rest duration data "18" of the first tone has been set in the register ML2B, the routine goes through a step P1 to a step P2. In the step P2, it is determined that the data in the register ML2B is not "0", so that the routine goes to a step P9, in which the data "18" is decremented by 1. Subsequently, the steps P1, P2 and P9 are executed in every subsequent melody 2 control routine. When the data in the register ML2B becomes "0", steps P3 through P7 are executed. If the first tone is not a rest but a note, the step P4 yields "NO" so that a step P10 of the decrementing process like the step N7 in the melody 1 control routine is executed. If the tone duration data in the register ML2B is found to be "0" in the step P7, it means a chord. In this case, the routine goes to a step P8, in which a check is done as to whether the rest duration data in the register ML2B is "0". If it is not "0", the subsequent chord control routine shown in FIG. 11 is executed. If the data is "0", the routine goes to a step P11, in which the sound of melody 2 is turned off.

The tone duration data processing in the chord control routine will now be described with reference to the flow chart of FIG. 11. In the instant case, the tone duration data "30" for the first tone of the chord has been written in the register CDB at the start of sounding. Therefore, every time this chord control routine is executed, it goes through steps S1 and S2 to a step S6 of decrementing the tone duration data in the register CDB. When the data in the register CDB becomes "0", this is detected in the step S2, so that the routine goes through steps S3, S4 and S5 of processing for sound of the chord.

Now, the autoplay operation will be described in connection with a case when the musical piece shown in FIGS. 17A to 17C is automatically played under the condition that the melody guide mode, guide LED mode and following mode prevail. As an example of this operation, a case will be taken, in which the manual play of the melody 1 carried out by depressing keys under the guide of the "on" LED elements slightly leads or lags behind the score shown in FIGS. 17A to 17C so that the score shown in FIG. 19 results, owing to the following mode. The guide mode switch, first guide LED switch, second guide LED switch and following mode switch are all turned "on". With the start of the autoplay, data "11100011" (which is "E3" in hexadecimal form) is set in the register COMFG.

When the routine of FIGS. 8A to 8C is started, the steps M1 through M6 are executed to be ready for the start of the sound. In the step M4, the data in the register COMFG is updated to "10100011" (i.e., "A3" in hexadecimal form).

Figure 20D:
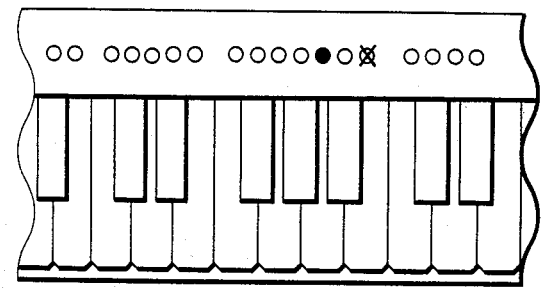
Figure 20E:
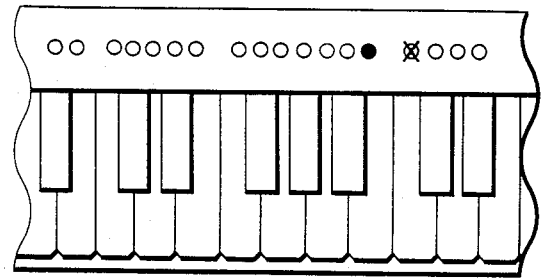
Figure 20F:
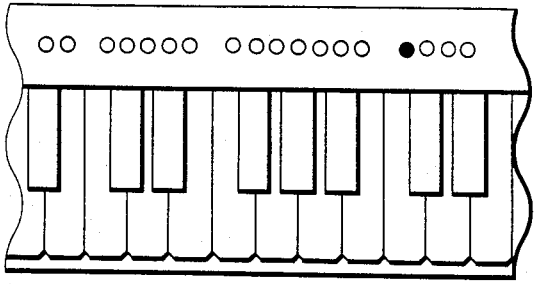

The routine then goes through the step M7 to the step M8 of the melody 1 control, i.e., one routine shown in FIGS. 9A to 9C. The steps N1, N2, N3, N5, N6 and N8 are thus executed as mentioned earlier. In the subsequent step N13, the presence of the following mode is detected, so that the routine goes to the step N14. In the step N14, the data "A3" of the register COMFG and data "F7" are ANDed and, as a result, the data in the register COMFG is changed to "A3", that is, the 4th bit flag of the fastfeed is reset. Subsequently, the data "A3" in the register COMFG and data "10" are ANDed, and the data is changed to "10110011" (i.e., "B3" in hexadecimal form), that is, the 5th bit flag of the waiting state is set to "1". Then the steps N15, N16, N17, N18 and N19 are executed to complete the melody 1 control routine. At this time, only the LED element corresponding to G4 is held "on" for in this instance the first tone (G4) and the next tone are of the same note. This state of the guide LED array is shown in FIG. 20A. When the routine subsequently goes to the step M9, the flag "1" of the waiting state is detected, so that the routine immediately goes to the step M18. Then it immediately goes to the step M21, in which it is detected that the fastfeed flag is "0", thus bringing an end to the autoplay routine at this time. That is, since the waiting state prevails, the steps M10 and M11 of the melody 2 and chord controls, respectively, are not executed. This occurs for the purpose of causing the start of the sound of the melody 2 and chord by following the delay of the key operation for the melody 1 by an amount corresponding to a sixteenth-rest from the right timing labeled (1) in FIG. 19.

This routine will now be described more specifically. When the next autoplay routine has started and gone through the steps M1 and M2 in FIG. 8A to the step M7 in FIG. 8B, it is detected that the waiting state is in force, so that the routine goes to the step M12. In the step M12, the data "B3" in the register COMFG and data "4" are ANDed to check whether the result is "0". This is done for checking whether the key for the first tone note G4 in the melody 1 has been depressed. When the key is depressed, the key depression flag of the 3rd bit of the register COMFG is set to "1", so that the result of AND is not "0". However, since the key has not been depressed yet, the result is "0", so that the routine goes to the step M15 of incrementing the data in the register WTCNT by 1. Then the routine goes to the step M16, which is a step of checking if the count of the register WTCNT has become "60". This step is provided in order to forceably set the guide LED mode if it is not set when no key operation for the melody 1 has been done when the count noted above is "60", i.e., after the lapse of time corresponding to the whole note duration (see FIG. 14). With the guide LED mode forceably set, the LED element corresponding to the next key to be depressed is turned on, urging the player to depress the key. If the count of the register WTCNT has become "60", the routine proceeds to the step M17 of forceably turning on the LED element corresponding to the data in the register ML1A, i.e., corresponding to the next key of the tone in the melody 1 as described above. Also, the data in the register COMFG and data "1" are ANDed, and the melody 1 guide flag of the 1st bit of the data in the register COMFG is set to "1". That is, if the guide LED mode is absent, it is automatically set when the key operation is delayed for the whole rest. This situation corresponds to the case in which the guide mode switch and first guide LED switch are "on" and the second guide LED switch for the guide LED mode is "off". The forceably set guide LED mode is of course released so that the LED is turned off by depressing the corresponding key if the second guide LED switch is "off".

If it is determined in the step M16 that the result of the check is "NO", the routine goes to the step M21, thus bringing an end to the autoplay routine at this time.

Figure 19:
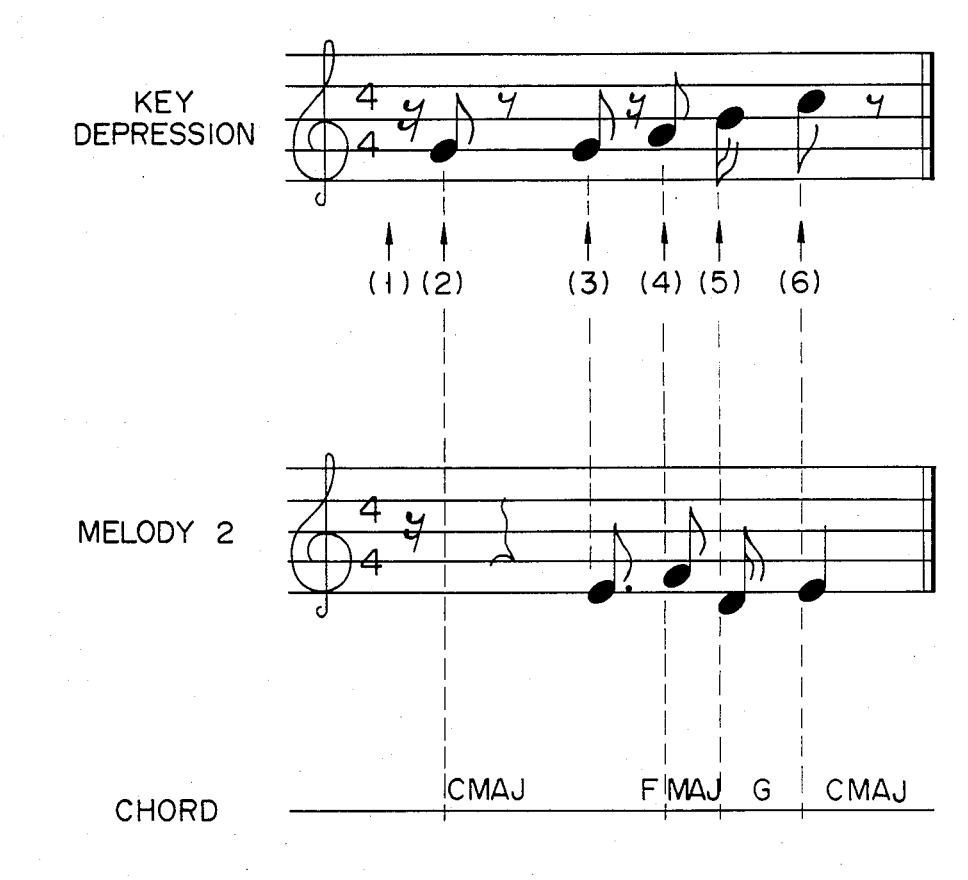

The steps M1, M2, M7, M12, M15, M16, M18 and M21 are repeatedly executed until timing (2) in FIG. 19, i.e., until the key for the first tone note G4 of melody 1 is depressed after a delay time for a sixteenth-rest duration. During this time, the sounding process with respect to the melody 1 and chord of the first tone is not executed, that is, the waiting state is in force and no sound is produced. The count of the register WTCNT is incremented by one every time the step M15 is executed. When the first tone note G4 is keyed after the delay time for a sixteenth-rest, the key depression flag in the 3rd bit of the register COMFG is set to "1". This is detected in the step M12, so that the routine goes to the step M13. In the step M13, a check is done as to whether the operation key code in the register KYRG is coincident with the key code of the first tone note G4 being in the register ML1A and sounded. If the two codes are coincident, that is, if the right key is operated, the routine goes to the step M14. Otherwise, it goes to the step M15 to continually increment the data in the register WTCNT. In the step M14, the data "B7" in the register COMFG and data "EF" are ANDed, so that the waiting state flag of the 5th bit is reset to "0". Also, the count of the register WTCNT is cleared. Subsequently, the step M10, i.e., melody 2 control, and step M11, i.e., chord control, are executed for processing the sound of the first tone. It is to be appreciated that the processing of the sound of the first tone with respect to the melody 2 and chord is started after a delay time for a sixteenth-rest duration to follow the delay of the key operation for the first tone of the melody 1. That is, the processing is synchronized to the key operation, which is convenient for manual play.

In the example of FIG. 19, neither waiting nor fast-feed but normal play takes place up to instant (3). In this example, the key operation for the second tone G4 is executed at the instant (3), i.e., while the processing for the first tone of one and a half time is not over after hearing the first tone G4 of melody 1, that is, while the processing of the eighth-rest data is not over. In other words, the key operation for the second tone G4 is executed an eighth-rest duration earlier than the right timing. In this case, the CPU 4 executes a process of setting the 4th bit of data in the register COMFG, i.e., the fastfeed flag, to "1". Consequently, in the subsequent autoplay routine the fastfeed flag of "1" is detected in the step M21 which is executed subsequent to the consecutive steps M1, M2, M7, M8, M9, M10, M11 and M13. The routine thus returns to the step M7 and repeats the steps M8, M9, M10, M11, M18, M21 and then step M7 again. When the data in the register ML1C which represents the rest duration data of the first tone of melody 1 becomes "0", the fastfeed flag is reset in the step N14. Thus, data "0" is subsequently detected in the step M21, thus bringing an end to the fastfeed routine and restoring the normal autoplay state. At this time, the eighth-note duration has been contracted as the second tone note E4 of the melody 2 due to the fastfeed as described above. Likewise, the eighth-note duration as the chord Cmaj has been contracted due to the fastfeed.

The routine goes through the steps M1, M2 and M7, and in the step M7 it is detected that the data is not "0". The routine then goes to the step M12. Since the key for the second tone note G4 of the melody 1 has been depressed, the routine goes through the steps M13 and M14, and then through the steps M10, M11, M18 and M21, thus bringing an end to the autoplay routine. When the timer 18 generates an overflow signal P once again, the step M1 is executed, and the routine goes to the steps M2, M7, M8, M9, M10, M11, M18 and M21. This sequence of operations is subsequently repeated. When the data in the register ML1B which represents the tone duration data of the second tone G4 of the melody 1 becomes "0", the waiting state flag in the 5th bit of the register COMFG is set. Consequently, it is subsequently detected in the step M9 that the data is not "0", whereby the execution of the steps M10 and M11 is temporarily suspended. It is assumed that at this time the key for the second tone note G4 of melody 1 is released but the key for the third tone note A4 is not depressed immediately.

This state is shown in FIG. 19. At this instance, the data in the register ML2A which represents the tone duration data of the second tone E4 of the melody 2 has been decremented to "0" in the step P9. Since the execution of the step M10 has been suspended, the sound of the second tone E4 is continued. A similar operation is in force for the chord Cmaj, so that the sound of the chord Cmaj is continued.

Meanwhile the waiting state flag in the 5th bit of register COMFG has been set to "1" at the instant of the release of the key for the second tone G4 of the melody 1. Thus, in the subsequent autoplay routine it is detected in the step M7 that the data is not "0", and the routine then goes to the step M12. Since the key for the third tone A4 of the melody 1 has not been immediately depressed, the register WTCNT is incremented in the subsequent step M15. Thus, the result of check in the subsequent step M16 is "NO", so that the routine goes through the steps M18 and M21, thus bringing an end to the autoplay routine. Subsequently, the steps M1, M2, M7, M12, M15, M16, M18 and M21 are repeatedly executed.

After the lapse of a sixteenth-rest, the key for the third tone G4 of the melody 1 is depressed (see the instant (4) in FIG. 19). Consequently, it is detected in the step M12 that the data is not "0", so that the routine goes to the step M13 and then to the step M14, in which the waiting state flag in the 5th bit of the register COMFG is reset and the register WTCNT is cleared. The routine then goes to the step M10. This routine, shown in FIG. 10, goes through the steps P1 and P2, and in the step P2 it is detected that the data in the register ML2B is "0", so that the routine goes to the step P3 in which the sound of the tone E4 is turned "off". The routine then goes through the steps P4, P5 and P6 to make the third tone E4 audible. A like sequence of operation is also executed for the chord to make the chord Fmaj.

A similar operation is subsequently executed, and when the key for the fourth tone B4 of the melody 1 is depressed immediately after the key for the third tone A4 has been depressed for the preset tone duration (see the instant (5) in FIG. 19), the melody 2 note D4 and chord note G7 of the fourth tone are sounded simultaneously with the key depression.

When the key for the fifth tone C5 of the melody 1 is depressed a sixteenth-note duration earlier than the right timing as shown at the instant (6) in FIG. 19, both the melody 2 note E4 and chord Cmaj of the fourth tone are sounded a sixteenth-note duration earlier.

As has been shown, the melody 2 data and chord data of the tones are sounded by detecting the instant of the key operation of the melody 1. The tone durations of the melody 2 and chord data are changed to follow the irregular key operation for the melody 1. FIGS. 20B to 20F show the state of the guide LED array at the respective instants (2) to (6) shown in FIG. 19. The LED elements indicated by the shaded circle are "on", and those indicated by the x'd circle are flickering.

Now, the cause of the flickering of the LED element will be described with reference to FIG. 12. This operation is executed at a constant frequency, e.g., for every 0.5 seconds, every time the timer 19 generates an overflow signal Q. In this routine, a step L1 is first executed, in which a check is done as to whether the autoplay is in force. If the result of the check is "YES", the routine goes to a step L2 of checking as to whether the guide LED mode is in force. If the result is "YES", the routine goes to a step L3 of checking for the turn-on timing. This check is done by checking if a turn-on flag in a predetermined register is set (i.e., "1") or reset (i.e., "0"). If the turn-on timing is detected, the routine goes to a step L4, in which the turn-on flag is reset to "0". The flag "0" is the turn-off timing or not turn-on timing for the next execution. The routine then goes to a step L5, in which the LED element corresponding to the key for the next tone data in the register ML1D to be heard is turned on, thus bringing an end to this routine. If the turn-on timing is not detected, the routine goes from the step L3 to a step L6, in which the turn-on flag is set to "1" for the next turn-on timing. Then the routine goes to a step L7, in which the LED corresponding to the key for the next tone data in the register ML1D to be heard is turned off. Since the steps L5 and L7 of turning on and off the LED are executed alternately according to the check in the step L3, the LED element LED 3 for the next key to be depressed is flickered.

In the above embodiment, when a key is depressed earlier than the right timing, the pertinent tone data is fastfed for sounding. However, this is by no means limitative, and it is possible to omit the sounding of the tone data till the timing of the key depression is correct. In this case, it may be arranged such that upon detection of the fastfeed in the step M21, the remaining value of the data in the registers ML1B and ML1C for the melody 1 may be calculated, and the values of the means for reading out the plurality of different autoplay music pieces may be set according to the result of calculation. Further, it may be arranged that the routine returns to the step M7 after clearing the data in the registers ML1B and ML1C to "0" and setting new values in these registers according to the melody 2 and chord data.

As has been described in the foregoing, when the timing of key operation by the player is correct, the following melody and/or chord data is fastfed at the correct timing, and the regular feed rate is recovered. On the other hand, when the timing of key depression by the player is dragging, the reading of the following melody and/or chord data is temporarily suspended, waiting for the operation of the next key. Thus, even if the key depression timing is deviated from the right timing, it is possible to recover autoplay based on the initial feed speed. This is very convenient for the beginner and will promote the effectiveness of manual play.

Further, even when the player is confusing to depress a key while performing a musical piece with a working bass and chord without setting the guide mode, the LED element corresponding to the key to be depressed is turned on along with the guide function after the lapse of, for instance, the time corresponding to one bar. Even on such an occasion, therefore, the player need not consult the score but need only concentrate on the keyboard. Further, by depressing the key corresponding to the LED element having been turned on with the guide function, the guide function is switched off again, thus permitting a more advanced exercise.

What is claimed is:

1. An electronic musical instrument, comprising:
   memory means for storing a plurality of different autoplay data including melody data and accompaniment data of at least one musical piece;
   reading means coupled to said memory means for reading the individual autoplay data sequentially at a predetermined rate;
   performing means coupled to said reading means for performing autoplay according to the readout autoplay data;
   guide means for giving a player an instruction of the next play operation to be executed according to at least one of the plurality of different readout autoplay data;
   comparing means for comparing the timing of play operation executed by the player after the instruction given by said guide means and a regular timing determined by the autoplay data readout from said memory means;
   correcting means coupled to said reading means and to said comparing means for correcting the readout rate of said plurality of different autoplay data according to the output of said comparing means; and
   control means for causing the read out operation of said autoplay data following corrected autoplay data corrected by said correcting means, to be at a speed corresponding to said predetermined rate until a timing of a next key depression by the player is compared with said regular timing by said comparing means.

2. The electronic musical instrument according to claim 1, wherein said correcting means includes a means which, when said timing of a play operation is leading, feeds said plurality of different autoplay data at a faster rate than the predetermined rate until said regular timing is reached.

3. The electronic musical instrument according to claim 1, wherein said correcting means includes a means which, when said timing of a play operation is leading, causes the sound according to said plurality of different autoplay data to be omitted until said regular timing is reached.

4. The electronic musical instrument according to claim 1, wherein said correcting means includes a means which, when a key to be depressed at a correct timing is not operated at all, discontinues the readout of said plurality of different autoplay data.

5. An electronic keyboard musical instrument comprising:
   guide function means for sequentially reading out stored autoplay data of at least one musical piece and indicating at least the pitch of the next tone to be sounded according to the readout autoplay data;
   means for turning "off" said guide function means; and
   guide control means for setting said guide function means to an "on" state after said guide function means has been turned "off" by said turning "off" means when a key operation according to said autoplay data has been interrupted for a predetermined period of time from a correct timing when a key should be operated.

6. The electronic musical instrument according to claim 5, wherein said guide control means includes means for turning said guide function means "off" again when a key operation is executed after said guide function means has been turned "on".

* * * * *

UNITED STATES PATENT AND TRADEMARK OFFICE
CERTIFICATE OF CORRECTION

PATENT NO. : 4,651,612

DATED : March 24, 1987

INVENTOR(S) : MATSUMOTO

It is certified that error appears in the above-identified patent and that said Letters Patent is hereby corrected as shown below:

Title page, left-hand column, the Assignee's address identified as "Tachikawa, Japan" should be -- Tokyo, Japan --.

Signed and Sealed this

Fifteenth Day of December, 1987

Attest:

DONALD J. QUIGG

*Attesting Officer*  *Commissioner of Patents and Trademarks*